(12) United States Patent
Martin

(10) Patent No.: US 10,827,545 B2
(45) Date of Patent: *Nov. 3, 2020

(54) COMMUNICATIONS DEVICE AND METHODS OF COMMUNICATING VIA A WIRELESS ACCESS INTERFACE TO PERFORM DEVICE-TO-DEVICE COMMUNICATIONS

(71) Applicant: Sony Corporation, Tokyo (JP)

(72) Inventor: Brian Alexander Martin, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,155

(22) Filed: Feb. 11, 2019

(65) Prior Publication Data

US 2019/0174565 A1 Jun. 6, 2019

Related U.S. Application Data

(63) Continuation of application No. 15/256,774, filed on Sep. 6, 2016, now Pat. No. 10,206,235, which is a
(Continued)

(30) Foreign Application Priority Data

Mar. 21, 2014 (EP) .................................... 14161202

(51) Int. Cl.
*H04W 76/14* (2018.01)
*H04W 72/04* (2009.01)
(Continued)

(52) U.S. Cl.
CPC .......... *H04W 76/14* (2018.02); *H04W 72/04* (2013.01); *H04W 76/18* (2018.02); *H04W 76/45* (2018.02)

(58) Field of Classification Search
CPC ............................. H04W 84/18; H04W 84/12
See application file for complete search history.

(56) References Cited

U.S. PATENT DOCUMENTS 9,380,605 B1 * 6/2016 Lee ........................... H04L 5/00
2011/0207485 A1 * 8/2011 Dimou .............. H04W 36/0055
455/507
(Continued)

FOREIGN PATENT DOCUMENTS

EP 2861009 A1 4/2015
WO 2013/183966 A1 12/2013
(Continued)

OTHER PUBLICATIONS

RP-122009, 3GPP Tsg Ran Meeting #58, Qualcomm Incorporated, Study on LTE Device to Device Proximity Services, 6 pages.
(Continued)

*Primary Examiner* — Zhiren Qin
(74) *Attorney, Agent, or Firm* — Xsensus LLP

(57) ABSTRACT

A communications device and method of communicating using a communications device is disclosed for performing device-to-device communications. The communications device is configured to determine in accordance with predetermined conditions whether the communications device is within a coverage area of a mobile communications network, and if the communications device is determined to be within the coverage area of the mobile communications network, to transmit or to receive signals via the wireless access interface to one or more other communications devices in accordance with device to device communications using communications resources of the wireless access interface allocated according to a first mode in which the mobile communications network performs resource allocation.

7 Claims, 14 Drawing Sheets

Related U.S. Application Data continuation of application No. PCT/EP2015/052654, filed on Feb. 9, 2015.

(51) Int. Cl.
*H04W 76/18* (2018.01)
*H04W 76/45* (2018.01)

(56) References Cited

U.S. PATENT DOCUMENTS

| | | |
|---|---|---|
| 2012/0300662 A1 | 11/2012 | Wang et al. |
| 2013/0170343 A1* | 7/2013 | Ye .................. H04W 48/06 370/230 |
| 2013/0170387 A1 | 7/2013 | Wang et al. |
| 2013/0189973 A1* | 7/2013 | Chang ................ H04W 24/02 455/423 |
| 2013/0324114 A1 | 12/2013 | Raghothaman et al. |
| 2014/0080500 A1 | 3/2014 | Iwamura et al. |
| 2015/0119088 A1* | 4/2015 | Lee ................... H04W 68/02 455/458 |
| 2015/0139176 A1 | 5/2015 | Morita et al. |
| 2015/0215981 A1* | 7/2015 | Patil ................ H04W 72/1263 370/329 |
| 2015/0264677 A1* | 9/2015 | He .................... H04L 5/0069 370/312 |
| 2015/0358888 A1 | 12/2015 | Gulati et al. |
| 2016/0014831 A1* | 1/2016 | Lee .................... H04L 67/1061 370/329 |
| 2016/0338136 A1* | 11/2016 | Zhang ................. H04W 76/19 |
| 2017/0006524 A1 | 1/2017 | Jung et al. |
| 2017/0034865 A1 | 2/2017 | Jung et al. |
| 2017/0055280 A1 | 2/2017 | Kim et al. |

FOREIGN PATENT DOCUMENTS

| | | |
|---|---|---|
| WO | 2015/113690 A1 | 8/2015 |
| WO | 2015/113696 A1 | 8/2015 |
| WO | 2015/113719 A1 | 8/2015 |
| WO | 2015/113720 A1 | 8/2015 |

OTHER PUBLICATIONS

R2-134431, General Dynamics, Simulation Results for D2D voice Services Using Connectionless Approach, 3 GPP TSG-RAN2#84, San Francisco, USA, Nov. 11-15, 2013, 6 pages.

Rs-134426, LG Electronics Inc., Medium Access for D2D Communication, 3 GPP TSG-RAN WG2#84, San Francisco, USA Nov. 11-15, 2013, 9 pages.

R2-134248, General Dynamics Broadband UK, Possible Mechanisms for Resource Selection in Connectionless D2D Voice Communication, 3GPP TSG-RAN2#84, San Francisco, USA Nov. 11-15, 2013.

R2-134246, General Dynamics Broadband UK, The Synchronizing Central Node for Out of Coverage D2D Communication, 3GPP TSG-RAN2#84, San Francisco, USA, Nov. 11-15, 2013, 3 pages.

Tdoc R2-134238, Ericsson, D2D Scheduling Procedure, 3GPP TSG-RAN WG2#84, San Francisco, USA, Nov. 11-15, 2013, 7 pages.

R2-133840, Samsung, CSMA/CA Based Resource Selection, 3GPP TSG RAN WG2 #84, San Francisco, USA Nov. 11-12, 2013, 4 pages.

R2-133990, Orange, Huawei, HiSilicon, Telecom Italia, Network Control for Public Safety D2D Communications, 3GPP TSG-RAN WG2 Meeting #84, 6 pages.

Harri Holma et al, Wiley, LTE for UMTS OFDMA and SC-FDMA Based Radio Access, System Architecture Based on 3GPP SAE, 3.2 Basic System Architecture Configuration With Only E-UTRAN Access Network 4 pages.

Xiaogang et al., D2D Resource Allocation Under the Control of BS, University of Electronic Science and Technology of China, DCN 16-13-0123-02-000n, 7 pages.

International Search Report and Written Opinion, issued in International Application No. PCT/EP15/052654, International Filing Date of Feb. 9, 2015, 12 pages.

Office Action and Search Report issued in Chinese Application 201580010567X dated Feb. 28, 2019.

Japanese Office Action dated Jan. 14, 2020, issued in corresponding Japanese Patent Application No. 2017-540213.

\* cited by examiner

Mode 2; Out of coverage operation

Operation of PTT UE to determine connection failure / establishment

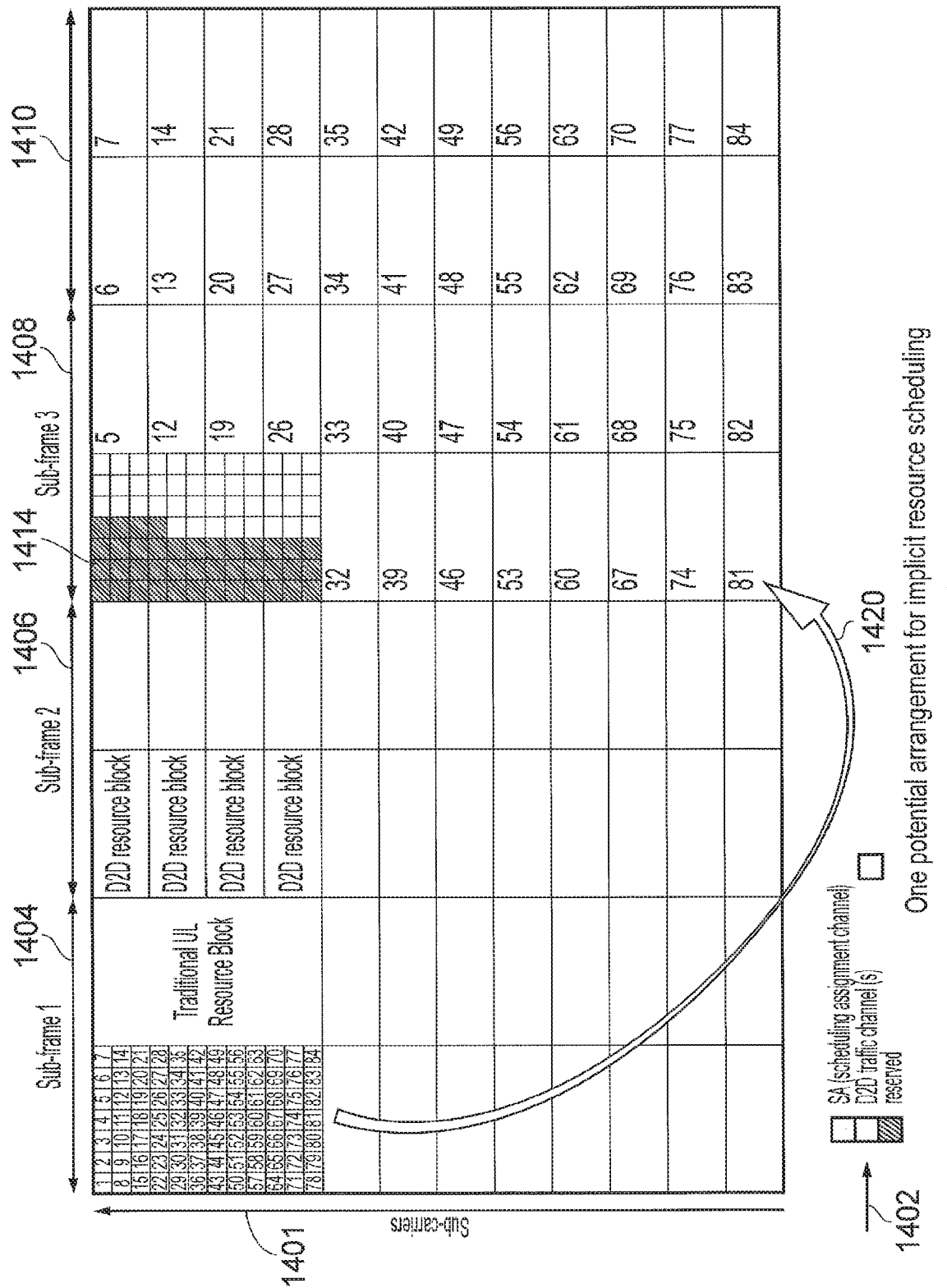

COMMUNICATIONS DEVICE AND METHODS OF COMMUNICATING VIA A WIRELESS ACCESS INTERFACE TO PERFORM DEVICE-TO-DEVICE COMMUNICATIONS

CROSS-REFERENCE TO RELATED APPLICATIONS

The present application is a continuation of U.S. application Ser. No. 15/256,774, filed on Sep. 6, 2016, which is a bypass continuation application of PCT application PCT/EP2015/052654, filed Feb. 9, 2015, which claims the benefit of priority to European Patent Application 14 161 202.8, filed in the European Patent Office on Mar. 21, 2014, the entire contents of which being incorporated herein by reference.

TECHNICAL FIELD OF THE DISCLOSURE

The present disclosure relates to communications devices and methods for communicating data using communications devices, and in particular to communications devices which are configured to perform device-to-device communications.

BACKGROUND OF THE DISCLOSURE

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network. In order to address these limitations, in LTE release-12 the ability for LTE communications devices to perform device-to-device (D2D) communications will be introduced.

D2D communications allow communications devices that are in close proximity to directly communicate with each other, both when within and when outside of a coverage area or when the network fails. This D2D communications ability can allow user data to be more efficiently communicated between communications devices by obviating the need for user data to be relayed by a network entity such as a base station, and also allows communications devices that are in close proximity to communicate with one another although they may not be within the coverage area of a network. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area.

Fourth generation networks have therefore been proposed as a cost effective solution to public safety communications compared to dedicated systems such as TETRA which are currently used throughout the world. However, the potential coexistence of conventional LTE communications and D2D communications within a single coverage area or network may increase the complexity of coordinating communications and resource allocation within an LTE network. In some applications a D2D communication must be performed urgently and so there may be a requirement to provide an arrangement in which a communications device can access communications resources quickly.

SUMMARY OF THE DISCLOSURE

According to a first example embodiment of the present technique there is provided a method of communicating using a communications device via a wireless access interface to perform device-to-device communications. The method comprises determining in accordance with predetermined conditions whether the communications device is within a coverage area for transmitting or receiving radio signals using a wireless access interface provided by a mobile communications network, and if the communications device is determined to be within the coverage area of the mobile communications network, transmitting or receiving signals via the wireless access interface to one or more other communications devices in accordance with device to device communication using communications resources of the wireless access interface allocated according to a first mode in which the mobile communications network performs resource allocation. Alternatively, if the communications device is determined not to be within the coverage area of the mobile communications network, then transmitting or receiving signals via the wireless access interface to one or more other communications devices in accordance with device to device communications using communications resources of the wireless access interface allocated according to a second mode in which the communications device allocates resources from a predetermined set of resources. The device to device communications protocol may be for example a contentious access of communications resources and a contention resolution procedure. If the communications device is determined to be within the coverage area of the mobile communications network, the transmitting or the receiving the signals via the wireless access interface using the first mode of resource allocation, includes accessing the mobile communications network to receive an allocation of the communications resources of the wireless access interface, detecting a failure condition in accessing the communications resources of the wireless access interface, and if the failure condition is detected then transmitting or receiving the signals via the wireless access interface by accessing the communications resources of the wireless access interface using the second mode of resource allocation.

Embodiments of the present technique can provide an arrangement for switching between a mode of operation in which a communications device which is to perform a device to device communication switches to a mode of operation in which the transmission or reception of data to other communications devices is performed in accordance with a device to device procedure or protocol even though the communications devices may be within a coverage area provided by a mobile communications network. The device to device communications protocol allows communications devices to allocate the communications resources of the wireless access interface with those resources being allocated by the mobile communications network.

As will be explained below conventionally when a communications device is within a radio coverage area provided by base stations or eNodeB of a mobile communications network then D2D communication is performed by allocating resources of a wireless access interface by the base station or eNodeB. However, in some examples the communications device may be operating in a situation in which an urgent communication is required such as may be required for emergency services or the like. It is envisaged that in some situations the network may be congested and thereby prevented from serving the communications device to provide the D2D communications. In this situation even though the communications device is within a coverage area provided the mobile communications network and would conventionally be assigned communications resources by the mobile communications network, a communications device operating in accordance with the present technique switches to a mode of operation in which D2D communications is performed according to a procedure which does not require allocation of resources by the mobile communications network in which the communications devices are operating autonomously. As such D2D communications can be performed even when a mobile communications network is either not operating or congested for some reason.

Various further aspects and features of the present disclosure are defined in the appended claims and include a communications device, a method of communicating using a communications device.

BRIEF DESCRIPTION OF DRAWINGS

Embodiments of the present disclosure will now be described by way of example only with reference to the accompanying drawings wherein like parts are provided with corresponding reference numerals and in which:

FIG. 14 is a schematic representation of a wireless access interface comprising a scheduling assignment region and regions shared communications resources and illustrating an operation in accordance with the present technique for supporting device-to-device communications.

DESCRIPTION OF EXAMPLE EMBODIMENTS

Conventional Communications System

Figure 1:
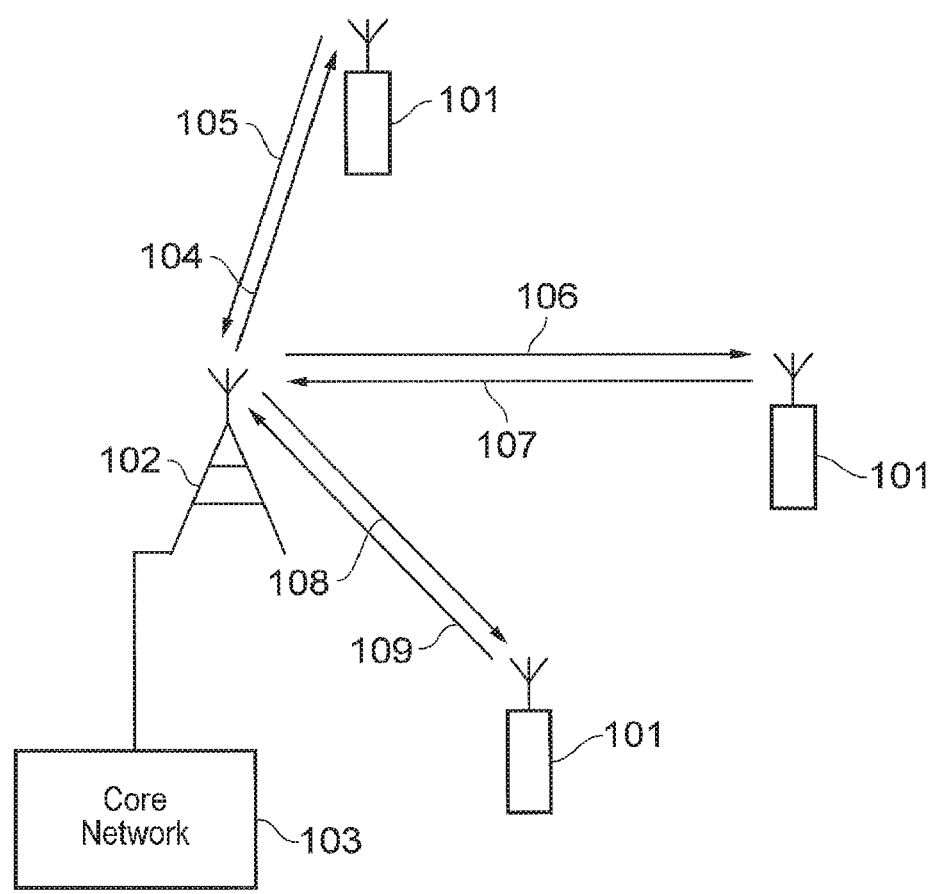
FIG. 1 provides a schematic diagram of a mobile communications system.

FIG. 1 provides a schematic diagram of a conventional mobile telecommunications system 100, where the system includes mobile communications devices 101, infrastructure equipment 102 and a core network 103. The infrastructure equipment may also be referred to as a base station, network element, enhanced Node B (eNodeB) or a coordinating entity for example, and provides a wireless access interface to the one or more communications devices within a coverage area or cell. The one or more mobile communications devices may communicate data via the transmission and reception of signals representing data using the wireless access interface. The network entity 102 is communicatively linked to the core network 103 where the core network may be connected to one or more other communications systems or networks which have a similar structure to that formed from communications devices 101 and infrastructure equipment 102. The core network may also provide functionality including authentication, mobility management, charging and so on for the communications devices served by the network entity. The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links represented by lines 104 to 109, where 104, 106 and 108 represent downlink communications from the network entity to the communications devices and 105, 107 and 109 represent the uplink communications from the communications devices to the network entity. The communications system 100 may operate in accordance with any known protocol, for instance in some examples the system 100 may operate in accordance with the 3GPP Long Term Evolution (LTE) standard where the network entity and communications devices are commonly referred to as eNodeB and UEs, respectively.

Figure 2:
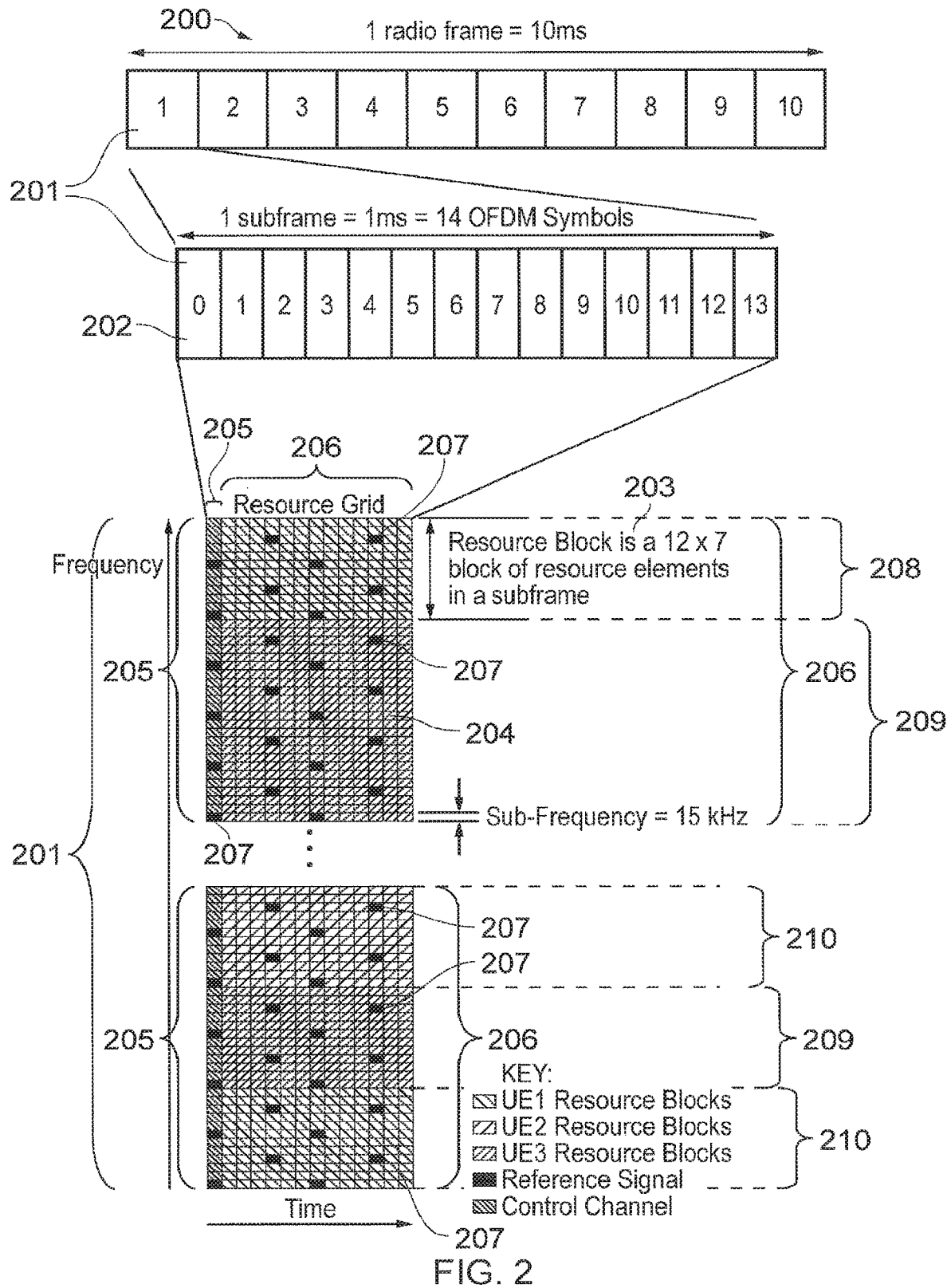
FIG. 2 provides a schematic diagram of the structure of a downlink of a wireless access interface of a mobile communications system.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of intersymbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element.

In the simplified structure of the downlink of an LTE wireless access interface of FIG. 2, each subframe 201 comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [11].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Figure 3:
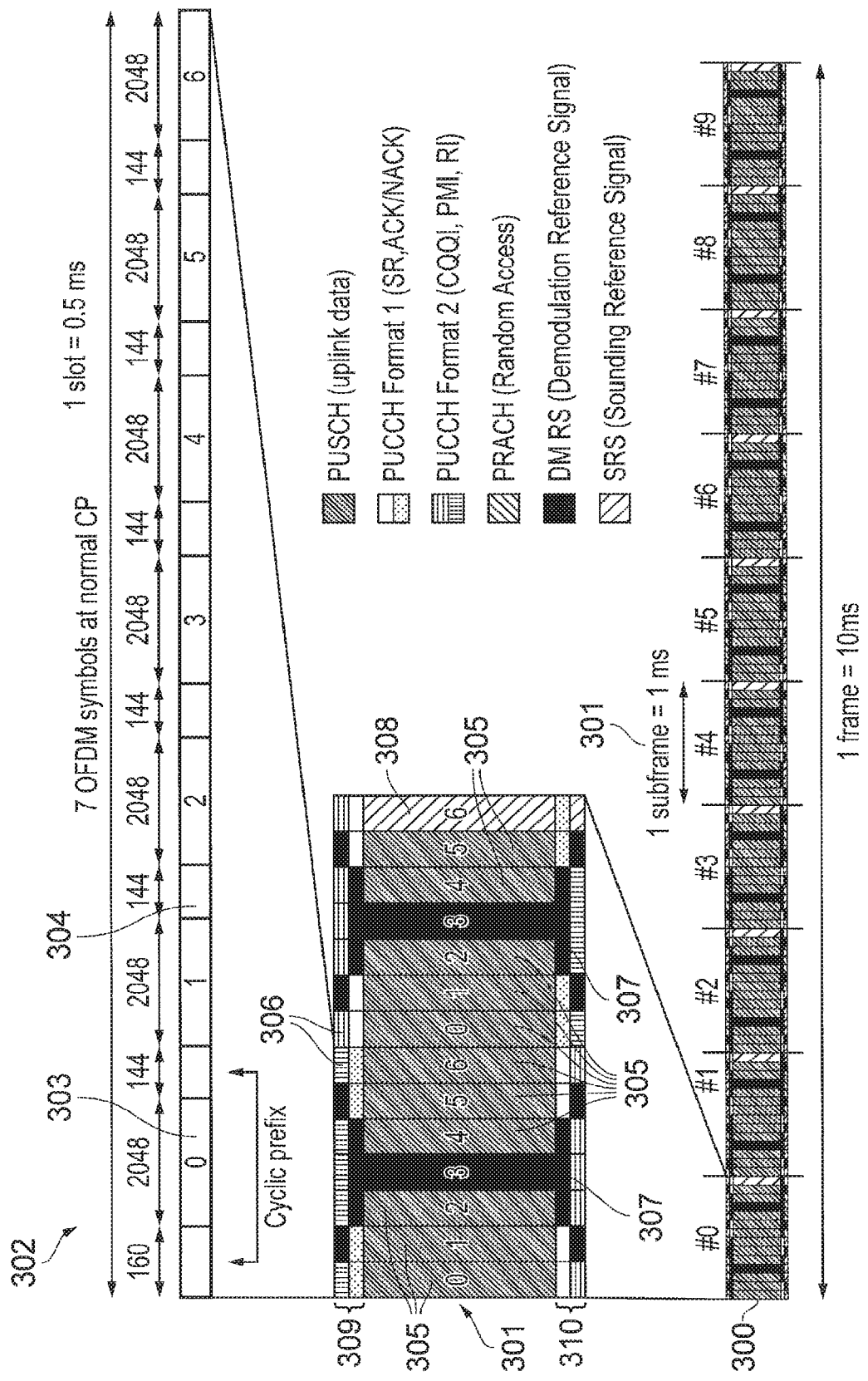
FIG. 3 provides a schematic diagram of an uplink of a wireless access interface of a mobile communications system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNode B. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralized systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

Device-to-Device Communications

D2D communications offer the possibility to address the aforementioned problems of network capacity and the requirement of network coverage for communications between LTE devices. For example, if user data can be communicated directly between UEs only one set of resources is required to communicate the data rather than both uplink and downlink resources. Furthermore, if UEs are capable of communicating directly, UEs within range of each other may communicate even when outside of a coverage area provided an eNodeB. As a result of these potential benefits, the introduction of D2D capabilities into LTE systems has been proposed.

Figure 4:
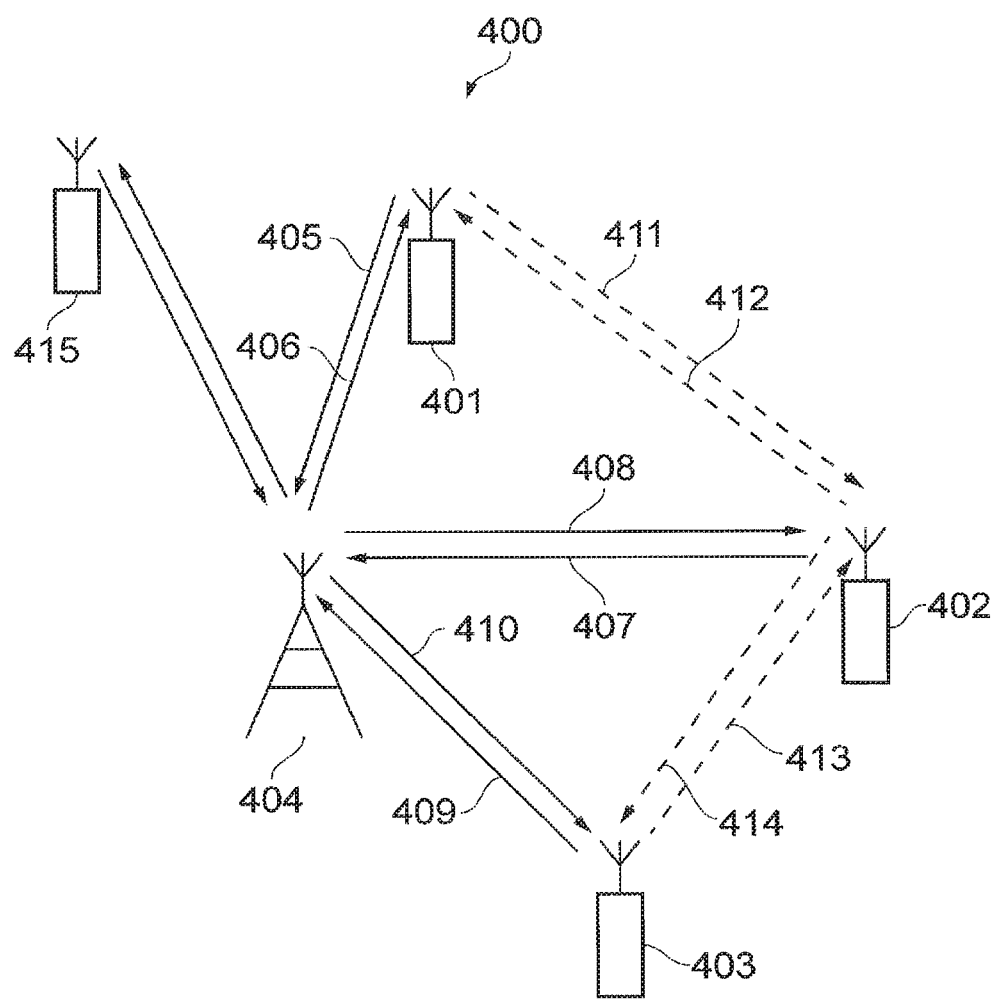
FIG. 4 provides a schematic diagram of a mobile communications system in which communications devices can perform device-to-device communications.

FIG. 4 provides a schematic diagram of a mobile communications system 400 that is substantially similar to that described with reference to FIG. 1 but where the UEs 401 402 403 are also operable to perform direct device-to-device (D2D) communications with one another. D2D communications comprise UEs directly communicating data between one another without user and or control data being communicated via a dedicated coordinating entity such as an eNodeB. For example, in FIG. 4 communications between the UEs 401 402 403 415 and the eNodeB 404 are in accordance with the existing LTE standard, but as well as communicating via the uplink and downlinks 405 to 410, when the UEs 401 to 403 are within range of each other they may also communicate directly with one another via the D2D communication links 411 to 414. In FIG. 4 D2D communications links are indicated by dashed lines and are shown to exist between 401 and 402, and 402 and 403 but not between 401 and 403 because these UEs are not sufficiently close together to directly transmit and receive signals to and from one another. D2D communications links are also shown not to exist between 415 and other UEs because UE 415 is not capable of D2D communications. A situation such as that illustrated in FIG. 4 may exist in an LTE network where UE 415 is a device not compliant with the specifications for D2D operation.

In order to establish a D2D communications link, such a one-way D2D communications link 414 from the UE 402 to the UE 403, a number of steps are required to be performed. Firstly, it is beneficial for the initiating UE to have knowledge of the other D2D capable UEs within range. In an LTE system this may be achieved for example by each UE periodically transmitting a discovery signal containing a unique "discovery" identifier that identifies UEs to one another. Alternatively, a serving eNodeB or coordinating entity may compile a list of UEs within its coverage area capable of performing D2D communications and distribute the list to the appropriate UEs within its coverage area. By virtue of either of the above processes the UE 401 may discover UE 402, UE 402 may discover UEs 401 and 403, and UE 403 may discover UE 402. Once UE 402 is aware of the existence of UE 403 it may then proceed to establishing a D2D communications link with UE 403.

Previously Proposed D2D Systems

It has previously been proposed to provide some arrangement for device to device communication within standards which define communications systems according to specifications administered by the 3GPP referred to as Long Term Evolution (LTE). A number of possible approaches to the implementation of LTE D2D communications exist. For example, the wireless access interface provided for communications between UEs and eNodeB may be used for D2D communications, where an eNodeB allocates the required resources and control signalling is communicated via the eNodeB but user data is transmitted directly between UEs.

The wireless access interface utilised for D2D communications may be provided in accordance with any of a number of techniques, such as carrier sense multiple access (CSMA), OFDM or a combination thereof for example as well as an OFDM/SC-FDMA 3GPP LTE based wireless access interface. For example it has been proposed in document R2-133840 [1] to use a Carrier Sensed Multiple Access, CSMA, co-ordinations of transmission by UEs, which is un-coordinated/contention based scheduling by each UE. Each UE first listens then transmits on an unused resource.

In another example, UEs may communicate with each other by negotiating access to a wireless access interface directly, thus overcoming the need for a coordinating eNodeB. Examples of previously proposed arrangements include those in which one of the UEs of the group acts as a controlling entity to co-ordinate the transmissions of the other members of the group. Examples of such proposals are provided in the following disclosures:
 [2] R2-133990, Network control for Public Safety D2D Communications; Orange, Huawei, HiSilicon, Telecom Italia
 [3] R2-134246, The Synchronizing Central Node for Out of Coverage D2D Communication; General Dynamics Broadband UK
 [4] R2-134426, Medium Access for D2D communication; LG Electronics Inc In another arrangement one of the UEs of the group first sends a scheduling assignment, and then transmits data without a central scheduling UE or controlling entity controlling the transmissions. The following disclosures provide examples of this de-centralized arrangement:
 [5] R2-134238, D2D Scheduling Procedure; Ericsson;
 [6] R2-134248, Possible mechanisms for resource selection in connectionless D2D voice communication; General Dynamics Broadband UK;
 [7] R2-134431, Simulation results for D2D voice services using connectionless approach; General Dynamics Broadband UK In particular, the last two contributions listed above, R2-134248 [6], R2-134431 [7], disclose the use of a scheduling channel, used by UEs to indicate their intention to schedule data along with the resources that will be used. The other disclosure, R2-134238 [5], does not use a scheduling channel as such, but deploys at least some predefined resources to send the scheduling assignments.

Other example arrangements disclosed in [8] and [9] require a base station to provide feedback to the communications devices to control their transmissions. Document [10] discloses an arrangement in which a dedicated resource exchanging channel is provided between cellular user equipment and device-to-device user equipment for interference control and resource coordination.

As a result of the possible approaches to the organisation of a D2D devices and networks, a number of scenarios may arise. A selection of example scenarios are provided by FIGS. 5a to 5d where each may cause different problems regarding the allocation of resources, the operation of D2D communications alongside conventional LTE communication and the movement of D2D capable devices between coverage areas provided by eNodeBs.

Figure 5A:
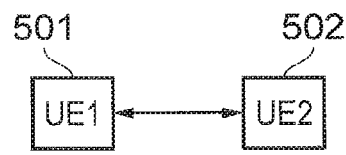
FIGS. 5*a* to 5*d* provides schematics diagrams of example device-to-device communications scenarios.

In FIG. 5a UEs 501 and 502 are outside of a coverage area of an eNodeB, consequently, the D2D devices may communicate with little or no regard for interference that may be caused by their D2D communications to neighbouring LTE networks. Such a scenario may occur in public safety communications for example, where either the UEs are outside of a coverage area or where the relevant mobile communications network is not currently functioning correctly. In such a scenario the communicating UEs may either negotiate directly with one another to allocate resources and coordinate communications, or one of the UEs or a third UE may act as a coordinating entity and therefore perform resource allocation.

Figure 5B:
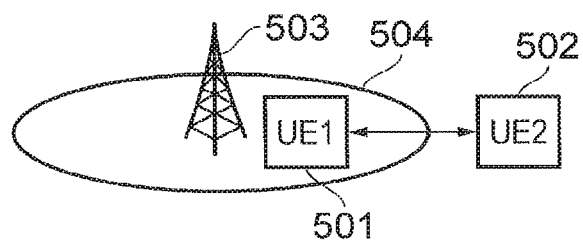

In FIG. 5b UE 501 is within a coverage area 504 of an eNodeB 503 and is performing D2D communications with UE 502 which is outside the coverage area 503. In contrast to the scenario of FIG. 5a, by virtue of UE 501 being within the coverage area of the eNodeB 503, D2D communications may cause interference to conventional LTE communications within the coverage area. Consequently, D2D resource allocations and transmissions may have to be coordinated around those within the coverage area 504 so conventional LTE communications are unaffected by D2D transmissions. This may be achieved in a number of ways, for example the eNodeB may coordinate the resource allocation for the D2D communications so that D2D resources and conventional LTE resources do not overlap. Any allocations may then be relayed to UE 502 by UE 501. Alternatively, UE 1 or UE2 via UE1 may for example perform resource allocation and then inform the eNodeB of the resources being utilised for D2D communications. The eNodeB will then reserve these resources for D2D communications.

Figure 5C:
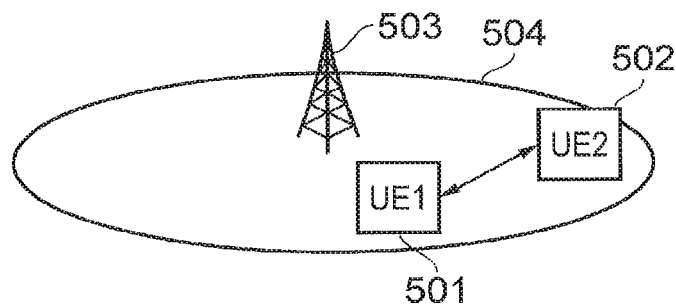

In FIG. 5c both UE 501 and 502 are within the coverage area of the eNodeB 503, consequently, coordination between the eNodeB and UEs will be required if D2D communications are to be performed without causing interference to conventional LTE communications within the coverage area. Such coordination may be achieved in a similar way to that described with reference to FIG. 5b but in the case of FIG. 5c UE 502 is also within the coverage area and therefore the relaying of resource allocation signals by UE1 to the eNodeB from UE 2 may not be required.

Figure 5D:
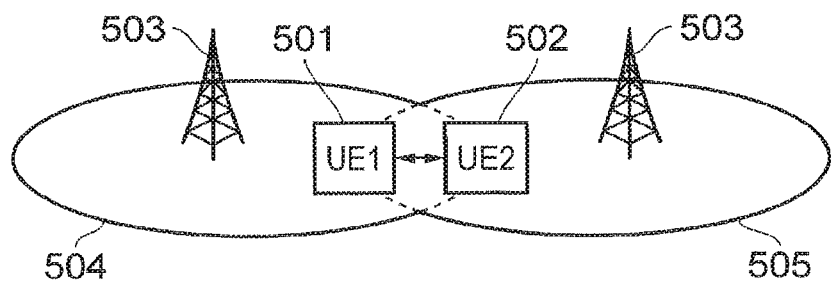

In FIG. 5d a fourth more complex D2D scenario is illustrated, where UE 501 and UE 502 are each within the coverage areas 504 505 of different eNodeBs 503 and 504 respectively. As for the scenarios of FIGS. 5b and 5c, coordination between the UEs performing D2D communications will be required if interference between D2D communications and conventional LTE communications is to be avoided. However, the presence of two eNodeB requires that resource allocations by the eNodeBs within the coverage areas 504 and 505 are required to be coordinated around the D2D resources allocations.

FIGS. 5a to 5d illustrates just four of a large number of possible D2D usage scenarios, where further scenarios may be formed from combinations of those illustrated in FIGS. 5a to 5d. For example, two UEs communicating as shown in FIG. 5a may move into the usage scenario of FIG. 5d such that there are two groups of UEs performing D2D communications in the coverage areas of two eNodeBs.

Once a D2D communications link is established resources of the wireless access interface are required to be allocated to the D2D link. As described above it is likely that D2D communication will take place in spectrum allocated for LTE networks, consequently it has been previously proposed that when within a coverage area of an LTE network, D2D transmission are performed in the uplink spectrum and that SC-FDM is used. Furthermore, as one of the motivating factors behind D2D communication is the increase in capacity that may result, utilising the downlink spectrum for D2D communications is not appropriate.

Co-pending EP patent application EP14153512.0 discloses an arrangement in which communications devices which are configured to perform D2D communications, the contents of which are incorporated herein by reference. The communications devices are arranged to reserve shared communications resources, such as those of the PUSCH of an LTE Up-link, by transmitting a scheduling assignment messages in a predetermined section of resources, referred to as a scheduling assignment region, allocated for performing contentious access. As disclosed in EP14153530.2, the contents of which are incorporated herein by reference, a contention resolution procedure is adopted by the communications devices so that if one or more communications devices transmit scheduling assignment messages contemporaneously in the same section of the scheduling assignment region then the communications devices can detect the contentious access and re-try at a different time. The operation of communications devices can according to this D2D communications procedure access is summarized in Annex 1 for completeness.

Operating Modes for Device-to-Device Communications

Embodiments of the present technique can provide an arrangement, in which communications devices can switch between different modes of operation for performing D2D communication. As explained above with reference to the different scenarios depicted in FIG. 5a-5d, communications devices or UEs may perform D2D communications in different environments, depending on whether the UEs are within a coverage area provided by the eNodeBs of a mobile communications network or not. According to the present disclosure the scenarios mentioned above are summarized as being either within coverage, which is referred to in the following description as mode 1, or out of coverage of an eNodeB, which is referred to as mode 2. These two modes of operation are presented in FIGS. 6 and 8, with a supporting explanation of an application of D2D communications which is a press to talk type operation between a group of D2D UEs.

Figure 6:
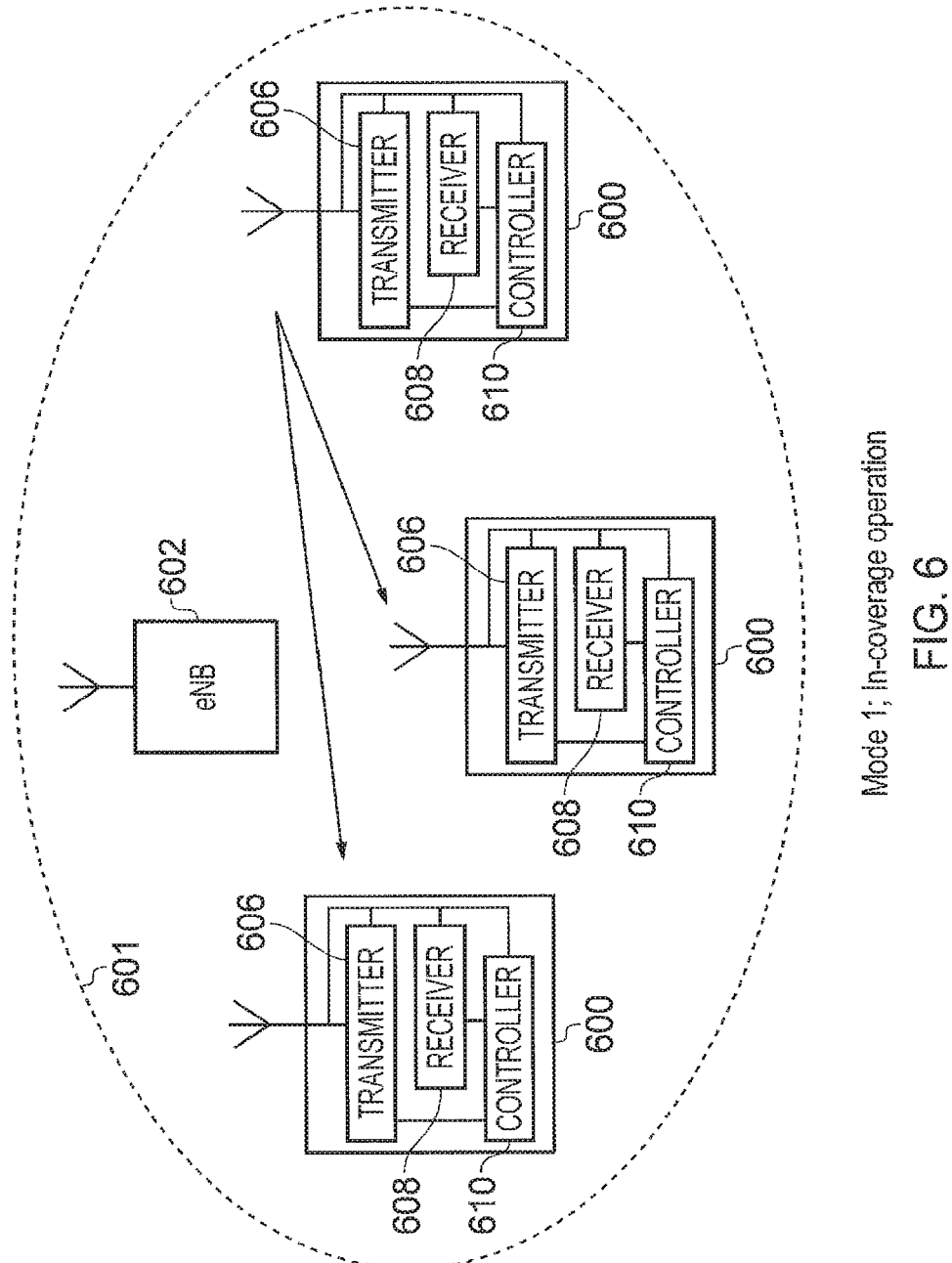
FIG. 6 provides a schematic block diagram illustrating an arrangement in which a plurality of communications devices form a group which perform device-to-device communications within a coverage area provided by a mobile communications network referred to mode 1 in the present disclosure.

FIG. 6 provides an example illustration of communications devices 600 which are operating within a coverage area represented by a dashed boundary line 601 provided by a base station or eNodeB 602. When D2D communications is performed within a coverage area provided by a mobile communications network then communications resources of a wireless access interface are provided under the control of the mobile communications network.

As shown in FIG. 6, each of the communications devices or UE's 600 includes a transmitter 606 and a receiver 608 which perform the transmission and reception of signals under the control of the controller 610. The controller 610 controls the transmitter 606 and the receiver 608 to transmit and receive data between members of the group to perform D2D communications. However, as will be appreciated in this mode of operation, which is referred to as mode 1 operation access to the wireless access interface is determined and controlled by the eNodeB 602.

Figure 7:
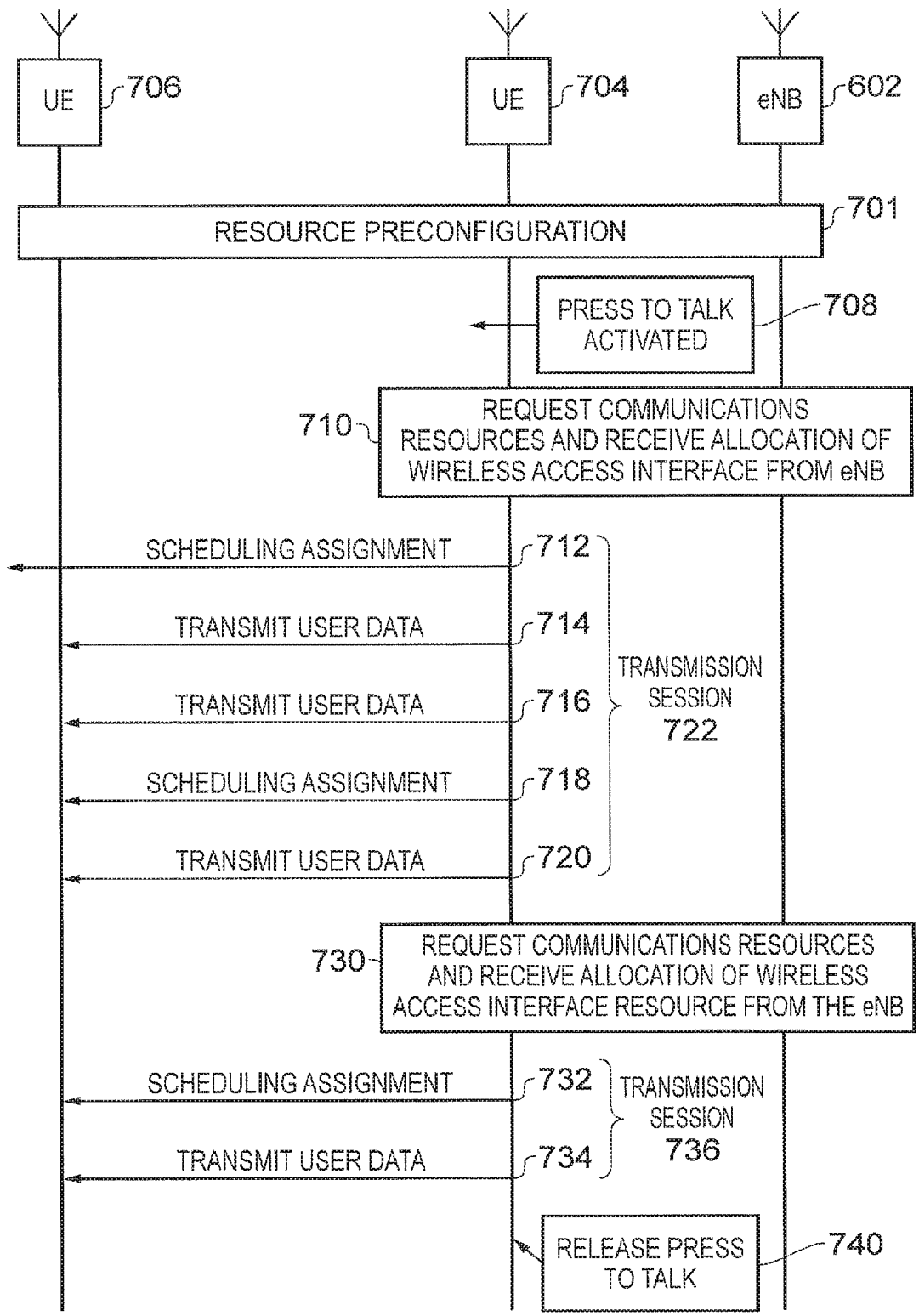
FIG. 7 is a flow diagram representing an example operation of communications device performing device to device communications in a press-to-talk (PTT) application when in a coverage area provided by a mobile communications network as represented in FIG. 6.

According to this example of the mode 1 operation, a procedure for performing D2D communications according to a press to talk type application for D2D communications is shown in FIG. 7, which is based in a disclosure provided in reference [5]. FIG. 7 provides a message sequence flow diagram illustrating a process in which a UE performs D2D communications within the coverage area 601 of an eNodeB 602 and therefore requests and receives allocations of communications resources from the eNodeB 602. As shown in FIG. 7 as a first part of the process the UEs 600 are arranged to be preconfigured for being allocating and accessing communications resources by being provided with encryption keys and authentication in a step 701. In step 702 a first communications device 701 wishes to transmit to other UEs in the group such as a UE 706 and so performs a press to talk activity as represented by a process step 708. According to one of the arrangements represented above the UE 704 then requests communications resources of a wireless access interface provided by the eNodeB 602 and receives a grant of communications resources of the wireless access interface from the eNodeB as represented in a process step 710. The first UE 704 then transmits a scheduling assignment message to the other UE in the group 706 using a message 712 and then transmits user data to the other UEs in the group on the steps 714, 716. A further scheduling assignment message may be sent 718 to continue to transmit user data to the other UEs 720. Thus the messages 712 to 720 represent the transmission session 722 for transmitting data to the other UEs. A further request for communications resources may be made in a step 730 to the other UEs to renew or receive a greater amount of communications resource from the eNodeB 602 as performed by a process step 730. A further scheduling assignment message 732 and user data transmission is performed in a further transmission session 736. Finally the UE 704 releases the press to talk request in a step 740 to release the communications resource, which have been allocated by the eNodeB 602 for the transmission for D2D communications.

Figure 8:
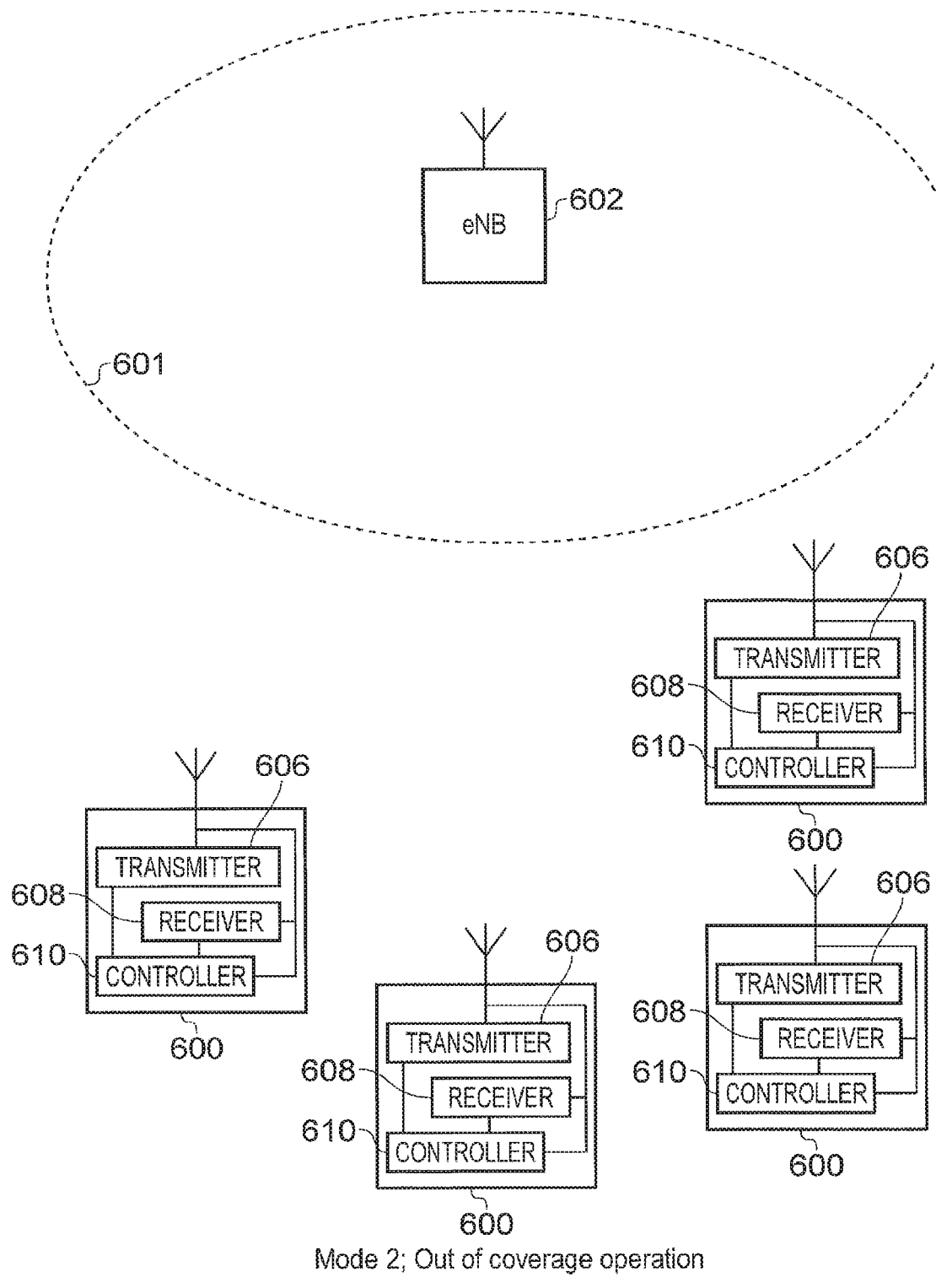
FIG. 8 provides a schematic block diagram illustrating an arrangement in which a plurality of communications devices form a group which perform device-to-device communications outside a coverage area provided by a mobile communications network and therefore operate autonomously which is referred to mode 2 in the present disclosure.
Figure 9:
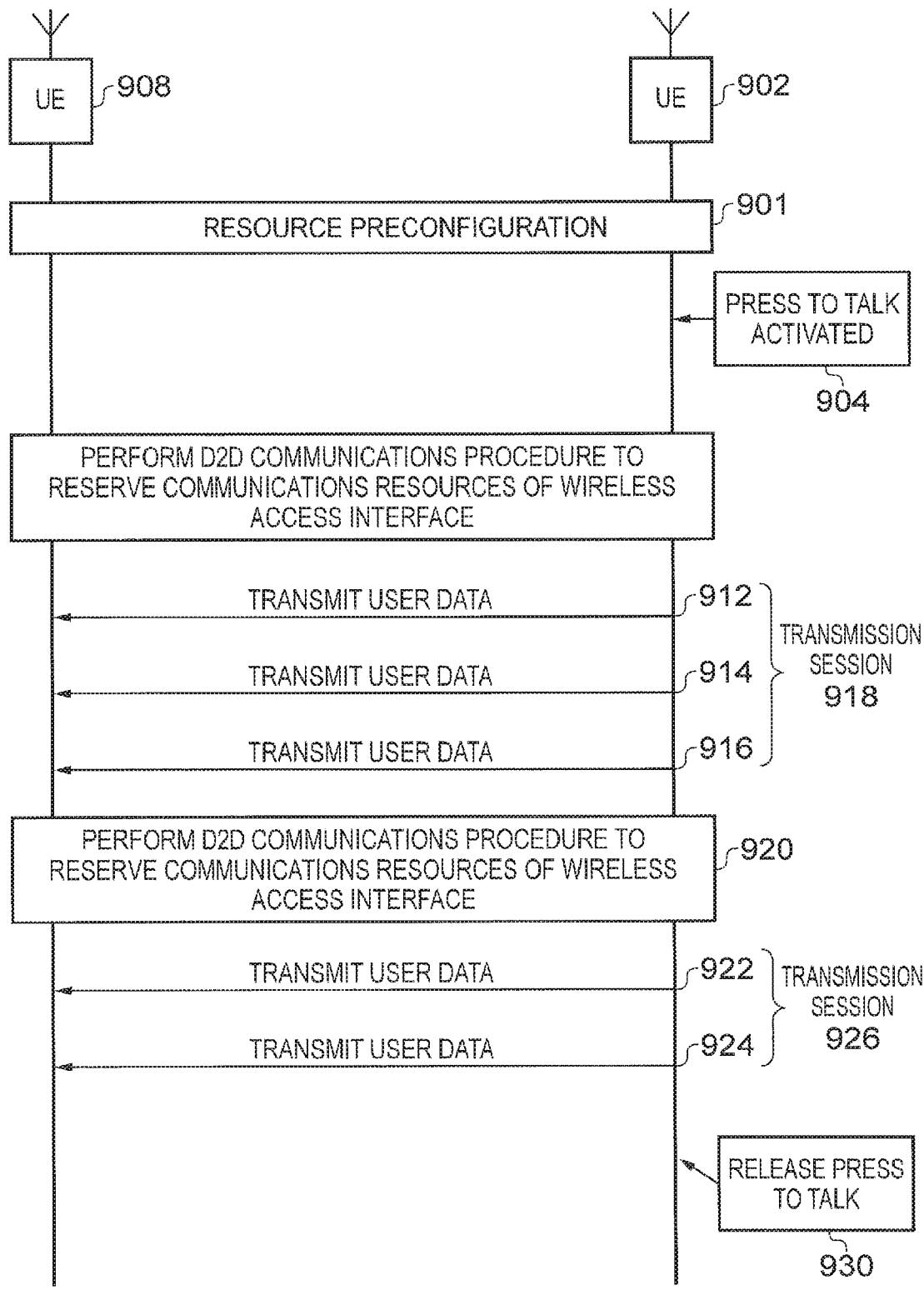
FIG. 9 is a flow diagram representing an example operation of communications device performing device to device communications in a press-to-talk (PTT) application when outside a coverage area provided by a mobile communications network as represented in FIG. 8.

A further example mode of operation as explained above is referred to as a mode 2 in which D2D communications are performed in an out of coverage mode in which the communications devices or UEs are outside a coverage area 601 of the base station 602 as represented in FIG. 8 which corresponds substantially to the example showing in FIG. 6 which corresponds to an in coverage operation of mode 1. Thus as shown in FIG. 8 the UE's 600 are outside the boundary 601 and therefore are outside a coverage area provided by the eNodeB 602. Whether or not the UE 610 is within a coverage area of the eNodeB 602, can be determined in accordance with predetermined conditions such as a downlink received signal strength indication which for example may be below a predetermined threshold. Thus the transmitter, the receiver and the controller 606, 608, 609 may determine in accordance with the received signal strength that the downlink transmissions from eNodeB are below a predetermined threshold and therefore conclude that the UE is operating outside a coverage area provided by the eNodeB 602. Accordingly, for the press to talk example as shown in FIG. 7, a message flow diagram corresponding to a press to talk operation in the mode 2 operation that is shown in FIG. 9. FIG. 9 is explained as follows:

As shown in FIG. 9, during a first process step, corresponding to step 701 in FIG. 7, the UEs perform a pre-configuration in which authentication and encryption keys are exchanged or provided by a communications network in order that the UEs can communicate via the wireless access interface. Thus in the first step resource configuration is performed 901. A first UE 902 then performs a press to talk activity as represented by a press to talk activated step 904. In a process step shown generally as a D2D communications procedure the first UE 902 performs a procedure to reserve communications resources of the wireless access interface in order to form a D2D communication to the second UE 908. The second UE 908 may be one device although there are other devices of the group available who may receive the communication from the first device 902. Having reserved the communications resources on the wireless access interface the first UE 902 then transmits user data to the other devices in the group 908 as represented by message transmission arrows 912, 914, 916. Accordingly, the transmission messages 912, 914, 916 are represented generally as a transmission session 918.

In a further operation the first UE 902 may perform a further D2D communications procedure to reserve communications resources of a wireless access interface 920 which may be required in order to renew the reservation or to reserve further resources as required. According, further transmissions occur 922, 924 in a further communications session 926. Finally after press to talk function is released in a step 930 so that the reserved resources are released by the UE 902.

According to the agreements above, the UE should use mode 1 when in-coverage of the network. For mode 1 operation, the UE has to be RRC Connected before mode 1 can operate. As will be appreciated there are some advantages for arranging that whenever the UE is in-coverage (according to the current definition: the cell being suitable) then the UE should establish an RRC Connection with the network and then the network schedules specific resources for the UE.

According to some examples, the mobile communications network can control whether mode 1 or mode 2 can be allowed. For example enabling mode 1 or 2 via system information, for example 1 bit indication for Mode 2 allowed in-coverage and/or out-of-coverage Mode 1 required (mode 2 not allowed) or mode 2 allowed in-coverage.

A problem can be perceived if a UE is required to operate in mode 1, because the UE would have to establish and an RRC connection from idle mode. As such, a UE, which is in a suitable cell, in idle mode, will delay any public safety or any other D2D communication by an amount of time which it takes to establish an RRC connection and request D2D resources and an eNodeB to allocate the resources. Under normal operating conditions a delay for communications caused by the UE having to move from idle to RRC connected state, would be a few hundred milliseconds, which does not represent a significant delay to establishing communications. However in some situations, particularly in a congested network, this delay may be unacceptable, or may even prevent a public safety device from being able to operate.

One example is that in case of a disaster, such as earthquake, bombing, or any situation, which requires D2D communications devices operated by emergency services to function, provide examples in which a mobile communications network may become congested because many people may attempt to call or text friends and relatives. This can cause congestion on PRACH and as a result the network may not be able to serve all UEs. This PRACH failure could also be caused by temporary interference, or even core network or an eNodeB failure.

For an example in which a mobile communications network becomes congested, the network could be arranged to set access class barring to prevent normal users from accessing a cell. Assuming that a public safety device will have a special access class (access classes 11-15 reserved for special devices) then these devices may be able to access the cell. However, updating access class barring parameters may take some time. Furthermore there are some network failure scenarios, which could prevent the communication of system information. In addition, even if the UE is able to establish a connection then the resource allocation may be unreliable in volatile circumstances.

It may also be possible in an emergency for a network to reserve resources for public safety D2D devices, and disable mode 1 communication, which would allow a UE in coverage to always use mode 2. However this also depends on an alert being sent to the operator and the network updating system information in time. It also depends on the specific operator's network having been already upgraded and tested to work with public safety devices. However, this may be costly and time consuming, and it may be necessary to allow D2D communication for the public safety case regardless of whether this is supported by an operator of a mobile communications network.

Hence, there are some scenarios in which it would be desirable for UEs to be able to communicate while in the coverage of a commercial network, which is not available. As such, it should be possible for the UE to use mode 2 operation as a first priority or at least be able to fall back to this mode if network failure is detected.

Mode Switching for D2D Communications

According to the present technique, in order to reduce a likelihood of failure of a communication for urgent or important communications, a communications device or UE is configured to switch to a mode of operation in which the transmission or reception of data to other UEs is performed in accordance with a device to device communications procedure even though the UEs may be within a coverage area provided by a mobile communications network. As will be explained conventionally when a UE is within a radio coverage area provided by base stations or eNodeB of a mobile communications network then D2D communication is performed by controlling access to allocate communications resources of a wireless access interface by the base station or eNodeB. However, in some examples a UE may be operating in a situation in which an urgent communication is required such as for emergency services or the like. It is envisaged that in some situations the network may be congested or prevented from serving the UE to provide the D2D communications. In this situation even though the UE is within a coverage area provided the mobile communications network, and would ordinarily be assigned communications resources by the mobile communications network, a UE operating in accordance with the present technique switches to a mode of operation in which D2D communications is performed according to a procedure which does not require allocation of resources by the mobile communications network in which case the UEs are operating autonomously. As such D2D communications can be performed even when a mobile communications network is either not operating or congested for some reason.

Figure 10:
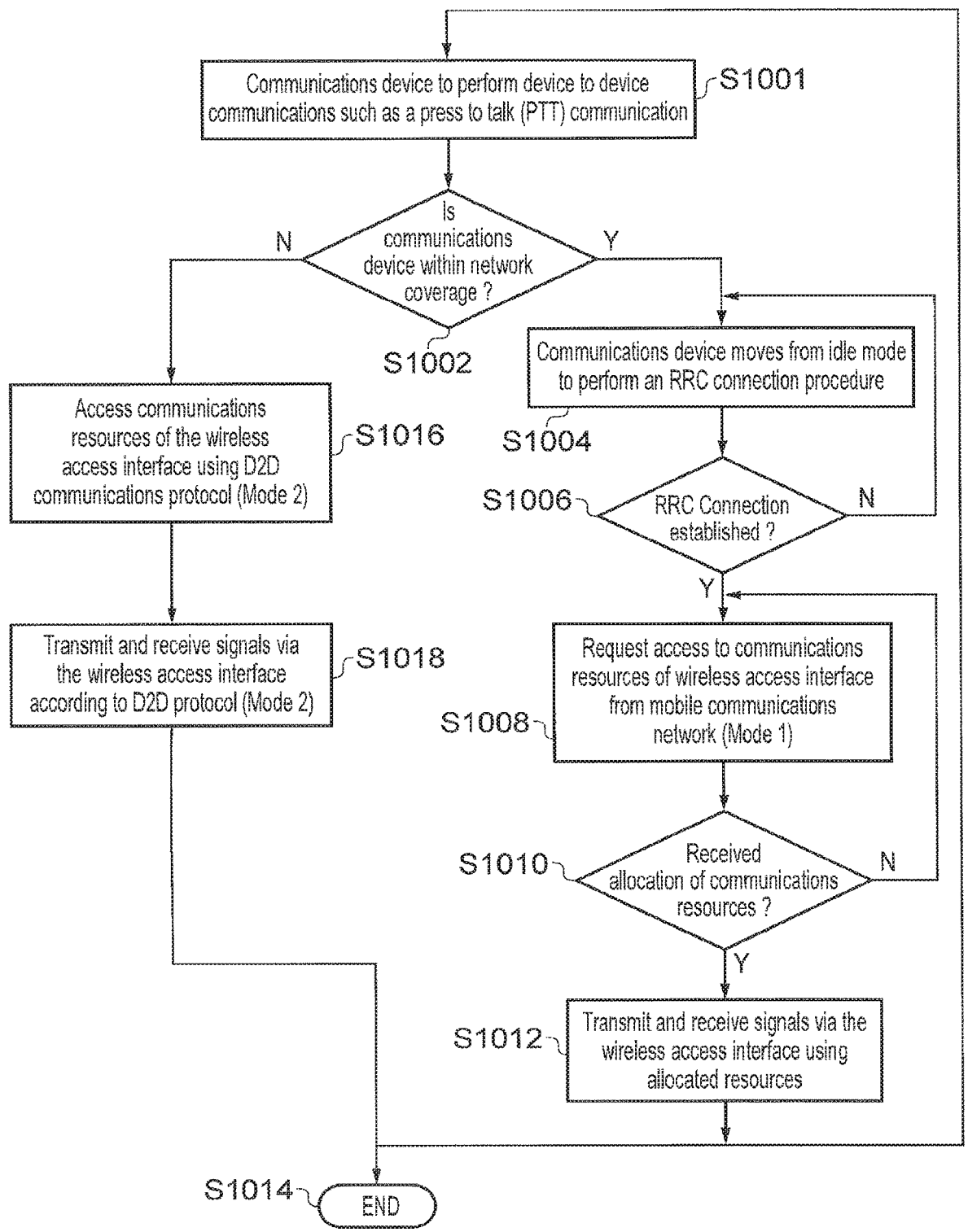
FIG. 10 is a flow diagram representing an example operation of communications device performing device to device communications when in a coverage area provided by a mobile communications network when selecting an appropriate operating mode to access communications resources provided by the wireless access interface.
Figure 11:
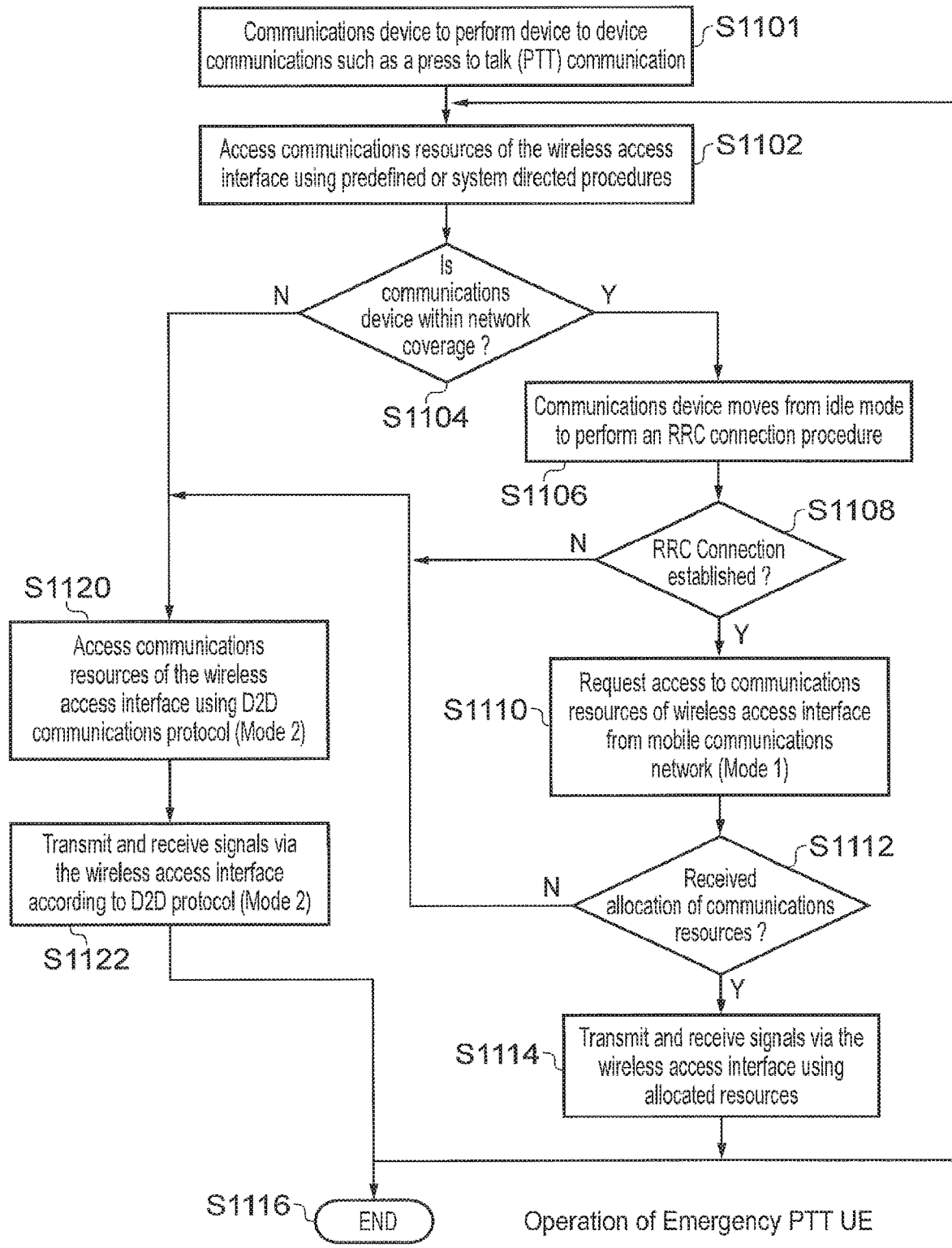
FIG. 11 is a flow diagram representing an example operation of communications device when in a coverage area provided by a mobile communications network and switching between a mode 1 operation to a mode 2 operation according to the present technique.
Figure 12:
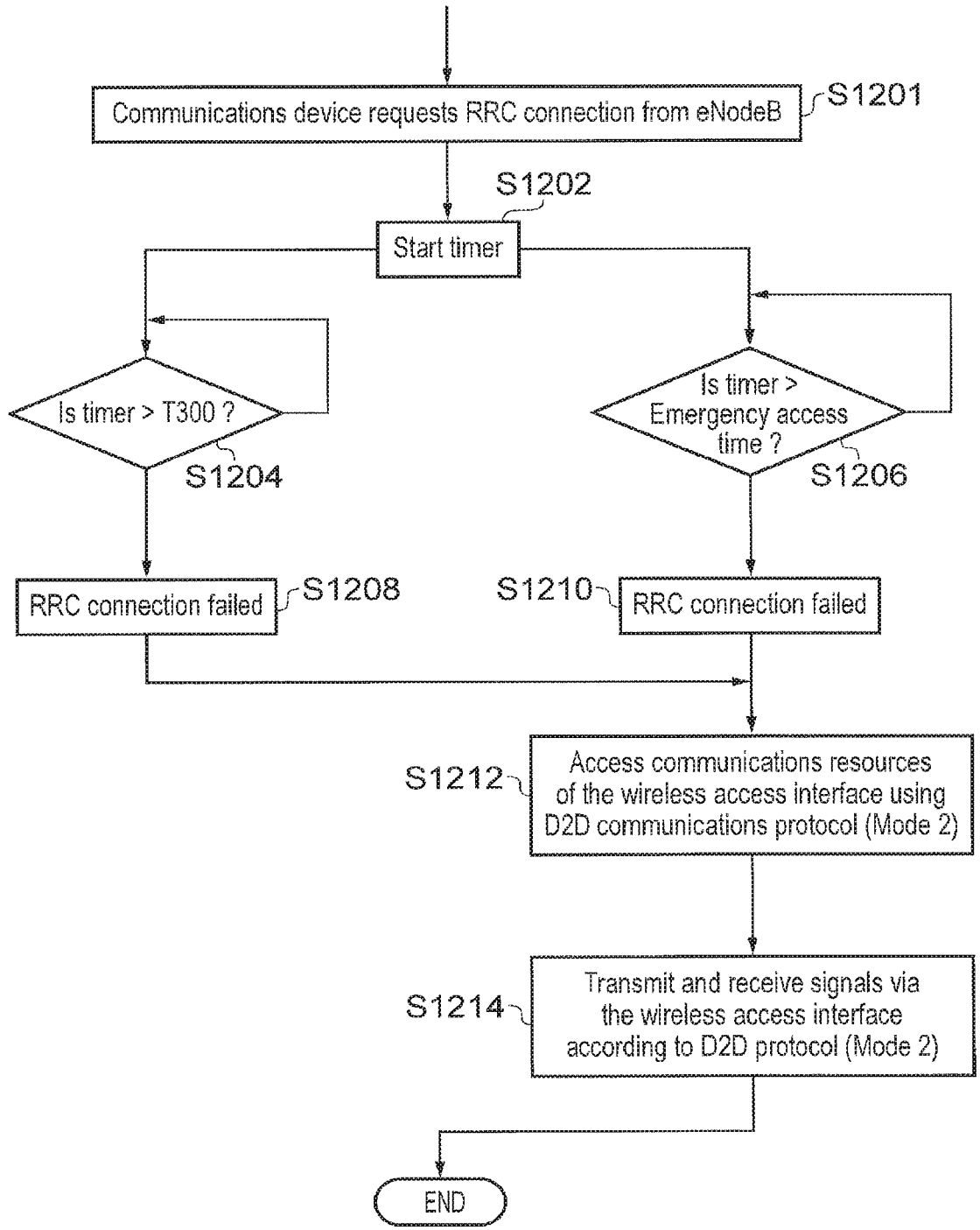
FIG. 12 is a flow diagram representing an example operation of communications device to determine whether a radio resource control connection establishment procedure has failed according to the present technique.

Some example embodiments of the present technique are presented in FIG. 10, 11 or 12. According to the first flow diagram the operation of a communications device or UE when switching between a first in coverage mode of operation or the second out of coverage mode operation is shown in FIG. 10. FIG. 10 therefore represents the operation of a communications devices which is configured by a network operator for example to preferentially perform D2D communications as directed by a network operator. FIG. 10 is summarized as follows:

S1001: In FIG. 10 as a first step, and corresponding steps 708 and 904 in FIGS. 7 and 9, a UE performs a D2D communication such as a press to talk communication 1001.

S1002: A UE first determines whether or not it is within a coverage area of a mobile communications network or not. This may be achieved, for example, by determining a received signal strength or by performing other functions such a detecting the presence of a broadcast signal. If the UE is within a coverage area then processing proceeds the step S1004.

S1004: The UE when in an idle mode within the coverage area of the mobile communications network moves from the idle mode to an Radio resource connected (RRC) connection procedure mode in order to establish an RRC connection.

S1006: The UE then determines whether an RRC connection has been established or not. If an RRC connection has not been established then processing proceeds back to step S1004 and the UE performs a conventional process to re-establish RRC connection. If the RC connection has been established then processing proceeds to step S1008.

S1008: Having established an RRC connection the UE is then in the RRC connected state. In this state and corresponding to mode 1 operation, the UE requests communications resources of the wireless access interface from the eNodeB in order to perform a transmission of data following a press to talk operation.

S1010: The UE then determines whether or not it has received an allocation of communications resources for performing the press to talk operation. If the UE has not received an allocation of resources then processing proceeds back to step S1008 to repeat a process for requesting resources from the mobile communications network. If resources have been allocated then processing proceeds to step S1012.

S1012: The UE then proceeds to transmit and receive signals via the wireless access interface using allocated communications resources from the eNodeB. Processing then terminates or moves back to the start steps S1012 or step S1001.

S1016: If at step S1002 the UE determines that it is not within the coverage area of a mobile communications network then at step S1016 the UE operates in a mode 2 in which it is automatously attempts to access communications resources of the wireless access interface using a D2D communications protocol. An example of such a protocol is provided in Annex 1 and also disclosed in our co-pending patent application number EP14153530.2 the contents of which are incorporated herein by reference.

S1018: Having gained access to communications resources or the wireless access interface, the UE performs a D2D transmission to other UEs within the group in accordance with the D2D communications protocol, but without reference to the mobile communications network.

As explained above, the present technique provides an arrangement in which a UE switches to a mode 2 operation even though it is within a coverage area of an eNodeB and would otherwise operate in mode 1. In some example the UE is configured to switch to mode 2 operation, that is operate autonomously and independently from the control of the mobile communications network, when it is configured as a class of UEs for which D2D communications is more important, such as for example when this UE is performing for example for emergency communications. As such, even though coverage is provided via mobile communications network, the UE acts automatously to the form D2D communications in the mode 2 operation, that is as if it is outside the coverage area of a mobile communications network.

An example operation is provided in FIG. 11, which is summarised as follows:

S1101: In correspondence with the process S1001 a UE operating for example in a press to talk application with other UEs in a group requires communications resources in order to transmit a press to talk transmission.

S1102: Generally, in accordance with some examples the UE may be allocated a separate carrier for performing D2D communications in which case the UE switches to this separate carrier. In other examples, the UE may enter a mode 2 operation, that is performing a D2D communications procedure such as contention access without control of the eNodeB. However, generally the UE will be arranged to operate in a mode 1 when it is within a coverage area provided by a mobile communications network.

S1104: The UE determines whether or not it is within a coverage area of a mobile communications network. This step S1104 may be performed in parallel or in place of step S1102. The operation of the UE is the same as the step S1002 shown in FIG. 10.

S1106: If the UE is within the coverage area provided by a mobile communications network the UE moves from the idle mode to an RRC connected mode by performing a RRC connection procedure.

S1108: The UE then determines whether a RRC connection has been established or not in accordance with a conventional operation. If an RRC connection has established then the UE moves to a RRC connected state.

S1110: If the UE has managed to establish an RRC connection then the UE requests communications resources from the wireless access interface from the mobile communications network in accordance with a mode 1 operation as shown in FIG. 10.

S1112: The UE then determines whether or not resources have been allocated from the eNodeB in accordance with a protocol allocating resources on request from the eNodeB. However, if no resources have been allocated then processing proceeds to step S1120 to perform D2D communications in accordance with a D2D communications procedure that is without requesting resources from the eNodeB. In one example a decision as to whether communication resources have not been allocated and so the UE should adopt mode 2 operation is determined with respect to a predetermined time for allocating resources. Thus if the UE has not received an allocation of communications resources within a predetermined time for requesting the resources that is a time from transmitting a random access message requesting resources, then the UE concludes that it should switch to mode 2 operation.

S1114: If the eNodeB allocates communications resources of the wireless access interface to the UE, then the UE transmits and receives signals by the wireless access interface to perform the D2D communications. Processing then proceeds back to step S1101 or ends at step S1119.

S1120: If the UE is unsuccessful in establishing a RRC connection from the eNode b or if the UE is not allocated resources of the wireless access interface from the eNode b after establishing an RRC connection then processing from steps S1108 or S1112 proceeds to step S1120 in which the UE switches to a mode 2 of operation. The movement from decision points S1108 and S1112 of the RRC connection establishment or allocation of communications resources is determined in response to a decision as to whether or not the communication can proceed for a press to talk type operation. As mentioned above, this may be determined for example after the expiry of a timer or at any point at which the eNodeB signals that the request for either RRC connection or communications resources has failed. More examples for the failing to connect in mode 1 operation will be explained shortly.

S1120: Even though the UE may be within a coverage area provided by the eNodeB, the UE or if not within a coverage area, the UE performs a D2D communications protocol or procedure in order to access communications resources of the wireless access interface.

S1122: The UE then transmits data in accordance with a D2D communication, for example using the press to talk application using the resources the wireless access interface which it has acquired in step S1120. Steps S1120 and S1122 correspond to steps S1016 and S1018 as shown in FIG. 10 and therefore correspond largely to a conventional operation. However, as will be appreciated the process which is shown in FIG. 11 is different from the process shown in FIG. 10 by allowing the UE to switch to mode 2 operation even though it is within a coverage area provided by a mobile communications network at any point during a process in which the UE is attempting to receive an allocation of communications resources on the wireless access interface in accordance with a mode 1 operation.

An example flow diagram of the decision point at which the UE is RRC connected or not that is steps S1106 and S1108 shown in FIG. 11 is shown in FIG. 12. The operation of the UE effectively to jump out of a conventional procedure for accessing communications resources in mode 1 is summarized as follows:

S1201: In step S1201 a UE performs a RRC connection procedure to request an RRC connection from the eNodeB in accordance with a conventional procedure.

S1202: The UE then starts a timer to determine whether or not the request for RRC connection has been successful. In parallel the timer is accessed with respect to decision points S1204 and step S1206.

S1204: In a first conventional operation the UE compares the timer for establishing a RRC connection with respect to a predetermined time value referred to as T300, which is specified for a conventional operation for moving to an RRC connected state. If the time is less than time T300 then the processing moves back to the start of the decision point S1204. If the time has expired then processing proceeds to step S1208.

S1206: If the timer has exceeded an emergency access time at decision point S1206 then in parallel, if, for example, the UE is performing an emergency application then the processing proceeds to step S1210 and the UE concludes that the RRC connection has failed. The predetermined time for emergency access may be set as being less than a time associated with a radio resource establishment procedure failure within which more than one response to a message can be received which is transmitted as part of the radio resource control establishment procedure. Processing then proceeds to step S1212.

S1208: If the timer T300 has expired, that is the timer set for establishing an RRC connection has been exceeded then the UE concludes that the RRC connection has failed. Processing then proceed to step S1212.

Step S1212: The UE proceeds to perform an access of the wireless access interface in accordance with a mode 2 operation using a D2D communications protocol and then transmits signals via the wireless access interface using the access resources in step S1214 which corresponds to step S1122 shown in FIG. 11.

Further Details of Operation

As will be appreciated from the operation explained above a UE operating to provide D2D communication can be arranged to switch to mode 2 operation when an attempt to perform mode 1 communication fails. A message flow diagram representing the operation of a UE performing mode switching to achieve D2D communications is shown in FIG. 13.

Figure 13:
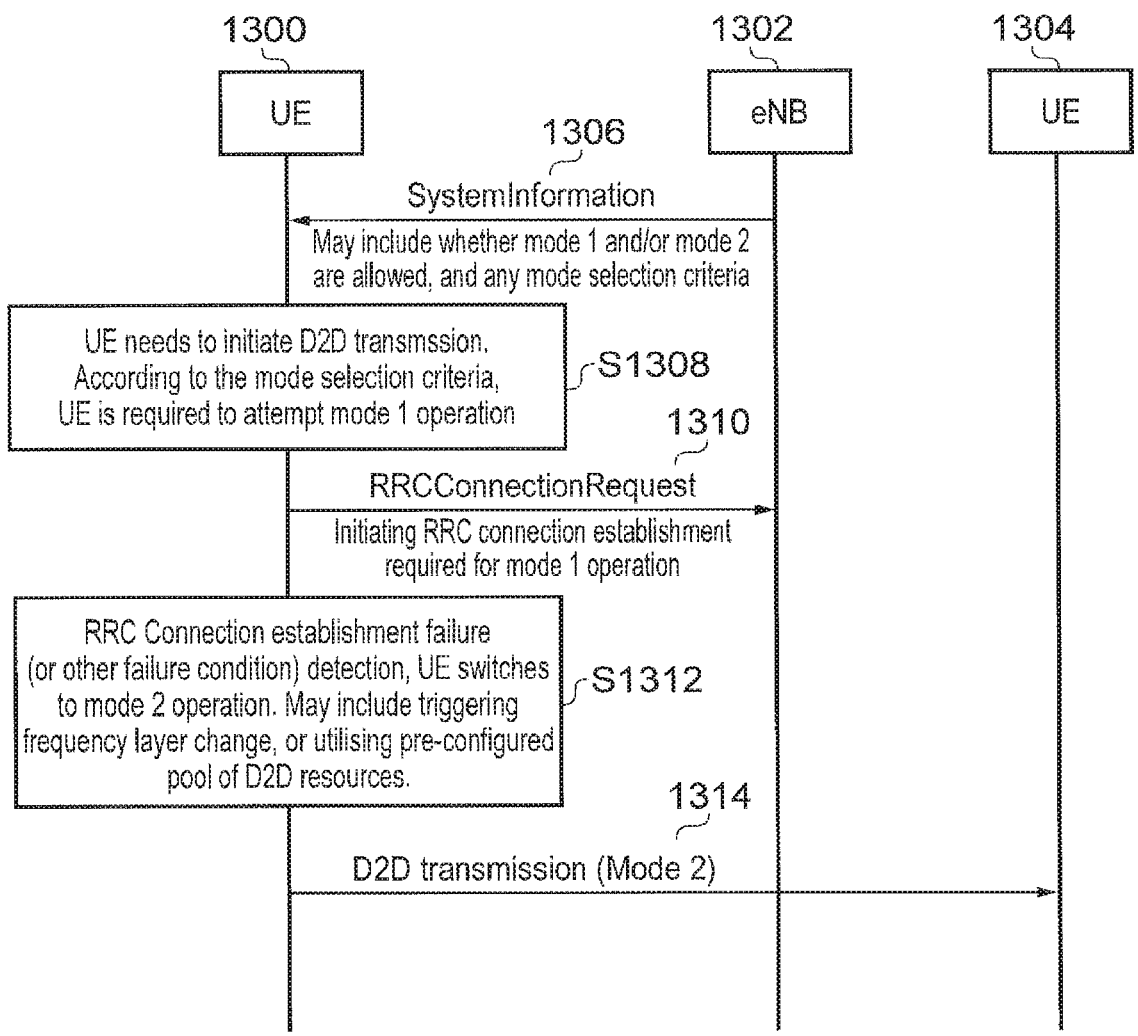
FIG. 13 is a message flow diagram representing a operation of a communications system according to an example of the present technique.

As shown in FIG. 13 a UE 1300 is arranged to perform D2D communications within a coverage area of an eNodeB 1302 to one or more other UEs 1304 in a group of UEs. As represented by a message 1306 the eNodeB may transmit system information indicating to the UE, whether mode 1 or mode 2 operation for D2D communications are permitted for the cell. In process step S1308, the UE 1300 requires to perform a D2D transmission and so according to the mode selection criteria the UE is required to attempt mode 1 operation. In a message transmission 1310 the UE 1300 performs an RRC connection request to establish an RRC connection for mode 1 operation. In a process step 1312, the UE detects the RRC connection establishment failure and so the UE switches to mode 2 according to the present technique. This may also include triggering a frequency layer change or utilising a pre-configured pool of radio resources for D2D communications. As represented by a message arrow 1314, the UE then proceeds to perform a D2D communication using a mode 2 operation.

An example operation of a D2D UE according to the present technique and reflecting the operations shown in FIG. 13, the UE operates as follows:

1) A UE may be configured as a class of UE to perform public safety operations. In some examples a UE may first attempt to prioritize mode 2 operation (UE scheduled), and use mode 1 (eNB scheduled) if mode 2 is not available. A commercial UE could be arranged to use mode 1, or at least as a priority.
   a. In case there is any dedicated carrier for D2D communication a UE should immediately switch frequency to the dedicated carrier;
   b. In case there is any reserved resource for in-coverage mode 2 operation then a UE may be configured to use this. A public safety UE in idle mode may also use the resources signalled for "edge-of-coverage", which are resources provided at an edge of a coverage area.
   c. Prioritization rules may be configurable by the mobile communications network as represented in FIG. 13.
2) In case mode 2 is not possible, according to the prioritization rules, then a UE may attempt mode 1 operation according to the network configuration. However upon detection of "failure condition" a UE may proceed with mode 2 operation regardless of the network configuration instructions. The failure conditions could be
   a. RRC connection establishment failure, at any point in the procedure, for example, no RAR received, no RAR received within a predetermined time, T300 timer expiry, RRC Connection Reject;
   b. Failure to decode/receive scheduling from the mobile communications network when in connected mode or radio link failure detection;
   c. Detection of barring parameters indication overload;
   d. Detection that neither mode 1 nor mode 2 is enabled in the network system information;
3) Fall back to mode 2
   a. On dedicated carrier or resource space on same carrier as an eNodeB, for example on a dedicated carrier may not be the prioritised mode, but may be available only in failure case.

The following provides further example embodiments of the present technique:

1) Prioritization.
   a. In case there is a dedicated carrier for public safety communication, or for D2D in general it is highly likely the UE will be required to use this as a first priority. Not only does it allow more reliable D2D communication (removing the potential for network failures) it also avoids consuming resources in the commercial network. In case there is a dedicated frequency layer known to the UE, UE should immediately switch to this layer to perform D2D—this dedicated frequency may be pre-configured in the device or it could potentially be obtained from the system information of the eNodeB.
      This may require some co-ordination between frequency layers. For example monitoring paging from the eNodeB on the downlink frequency while another uplink frequency is used for D2D transmission and/or monitoring. This may require some DRX/DTX to allow frequency switching, or it may be allowed in case of high priority communication to stop monitoring the down-link of the eNodeB.
   b. In case no dedicated frequency is available, the eNodeB may signal some resources (or could be preconfigured in the device) which are to be used for out of coverage or edge of coverage mode 2 operation. Even though the mode 1 may be preferred for commercial D2D use-cases, it may be allowed that public safety devices can use these even in good coverage conditions (or at least may be allowed to stay in idle mode). An eNodeB may need to be able to provide resources for the edge of coverage operation and these have to be reserved to avoid interference with regular LTE UEs.
   c. There are different possibilities to configure this from the network. The most likely would be some broadcast configuration which indicates whether mode 1 has to be used, whether mode 2 is allowed in coverage/edge of coverage. This is also providing resource pool for mode 2 transmission, resource pool for mode 1 and 2 reception, and potential dedicated frequency information.
      It is also possible that a UE could be configured while in RRC connected, with a UE specific transmission resource pool, using dedicated signalling or pre-configured with prioritization rule (e.g. high priority device may be allowed to perform mode 2 always when in idle mode, and mode 1 is used while connected)

2) Mode 1 failure detection
   a. In case the UE prioritization causes a UE to be in RRC connected to perform mode 1 operation, then an idle mode UE needs to trigger an RRC Connection establishment. This procedure itself may fail for several reasons, such as failure to receive random access response, T300 timer expiry, RRC Connection reject, contention resolution failure. The additional criteria would be to use an RRC connection establishment failure condition to switch from triggering the mode 1 operation to using mode 2. There may also be a (shorter) timer used for public safety RRC connection establishment (similar to T300) as explained above with reference to FIG. 12, which aborts connection establishment if it is not successful in the shorter than normally allowed time.
   b. In case the RRC Connection establishment is successful, or the UE is already in RRC Connected, the UE will have to send D2D scheduling requests to the eNodeB. In case the mobile communications network does not schedule the resources or for whatever reason the UE is not able to receive these scheduling commands from the eNodeB (e.g. during a timer or after a number of attempts) then the UE may automatically switch to the mode 2 operation, potentially moving to idle mode as part of the mode switch. Another reason would be detection of radio link failure (RLF) which would anyway cause communication failure, handover failure may also cause interruption in the communication with the eNodeB. In order to avoid the delay of waiting for an RRC connection re-establishment the UE may switch to mode 2 for completion of critical communication.
   c. Another potential trigger may occur before an RRC connection establishment is triggered. Even if the prioritization rules detect that mode 1 should be triggered, the UE could use access class barring information in system information to determine the network is already congested and so use mode 2 operation.
   d. If D2D communication has not been enabled in a particular network, for example an operator prefers not to allow commercial devices to perform D2D communications, and there is only one configuration, which is common for commercial and public safety devices, for example because the network has not yet been upgraded to support this operation, then high priority public safety events may require a UE to override this mode of operation and anyway use mode 2. This may potentially cause interference with the network.

3) Fall back to mode 2
   a. This can be as simple as aborting any RRC connection or RRC connection establishment attempt, and proceeding to use a preconfigured or semi-statically configured pool of resources, on the same frequency or another frequency, which are for mode 2 communication. This could take into account a network configuration for mode 2, for example a UE could start using resources configured for edge-of coverage operation, or there may be a "default" pool of resources that are used in case of network failure.

Various further aspects and features of the present invention are defined in the appended claims. Embodiments of the present technique find application with any communications device, which may perform D2D communications for any scenario. As such the following examples are provided:

A communications device can be used to provide public safety communications in the event of network failure;

An arrangement is provided which allows priority to public safety devices in crisis events to override poor network configuration;

Conventional devices can be arranged to follow the network configuration even in case of failure.

Annex 1: Example of Autonomous D2D Communications

An arrangement in which D2D communications can be performed between one or more UEs, which may form a group of UEs, without requiring a central entity to control the transmission of signals from the UEs to the other UEs of the group is briefly described with reference to FIG. 14. According to this arrangement, a wireless access interface is provided which includes a scheduling assignment region or channel in which scheduling assignment messages may be transmitted in a plurality of sections of communications resources. Each of the plurality of communications resource has a corresponding section of resources of a shared communications channel. The transmission of a scheduling assignment message in one of the sections of the scheduling assignment region can provide an indication to all of the other devices in a group that a UE wishes to transmit signals representing data in a corresponding section of the shared communications resources.

In FIG. 14, the wireless access interface is formed from a plurality of OFDM sub carriers 1401 and a plurality of OFDM symbols 1402 which can be divided into sections of communications resources. As shown in FIG. 14, the wireless access interface is divided into time divided units of subframes 1404, 1406, 1408, 1410 of communications resource. As shown in FIG. 14, every other subframe includes a scheduling assignment region 1412, 1414. The scheduling assignment region includes a plurality of sections of communications resource which are numbered in FIG. 14 from 1 to 84. A remaining part of the subframe 1404, 1408 in which a scheduling assignment region 1412, 1414 is included is divided into a plurality of sections of shared communications resources. Other subframes in which there is no scheduling assignment region 1412, 1414 are divided into sections of shared communications resource for the transmission of signals representing data by the UE to other UEs within the group. However, in combination a plurality of sections of communications resources of shared resources are provided within two subframes 1404, 1406, 1408, 1410 and each of the sections of shared resource corresponds to one of the sections of the scheduling assignment region 1412, 1414. Accordingly, a transmission by a UE in one of the sections of the scheduling assignment region of a scheduling assignment message indicates to the other UEs within the group that the UE which transmitted the scheduling assignment message in that section of the scheduling assignment region intends to transmit data in a corresponding section of the shared communications resources in which data can be transmitted. Thus as represented by the arrow 1420, the transmission of a scheduling assignment in section 81 of the scheduling assignment region 1412 provides an indication to the other UEs in the group that the transmitting UE that transmitted the scheduling assignment message intends to transmit data in the section numbered 81 of the scheduling assignment resource.

FIG. 14 therefore shows a potential arrangement for implicit resource scheduling. For the example shown in FIG. 14, the scheduling assignment resource or region 1412 has been chosen to be one uplink resource block of a conventional LTE wireless access interface, transmitted every second subframe.

In some examples, the scheduling assignment message may include one or more identifiers which may include but are not limited to an identifier of the transmitting UE, an identifier of the destination device or devices, a logical channel identifier, transport channel identifier, and application identifier, or an identifier of the group of UEs depending upon the application. For example if the group of UEs were engaged in a push-to-talk communications session, then the scheduling assignment message would not need to identify the individual device, but only the group of UEs. Other devices within the group, which detect the transmission of the scheduling assignment message in a section of the scheduling assignment region will know not to attempt to transmit in the corresponding section of the shared communications resources for transmitting data and will detect the identifier of the group of UEs. The devices of the group will therefore know to listen and to receive the data transmitted by the transmitting UEs (UE), which transmitted the scheduling assignment message, which included the group identifier.

As shown in FIG. 14 the resource numbered 81 corresponds to a region in the next available communications resource for that number that is in the third subframes 708. Thus there is a corresponding delay between transmission of the scheduling assignment message and the transmission of the data in order to provide notice to the other UEs in the group that that particular section of the shared communications resources has been reserved by one of the UEs for transmission.

In order resolve a contentious access a two phase contention resolution process is proposed:

In a Phase 1: A fixed sequence of listening for resource reservations (and potentially listening also for on going data transmission or other information such as measurements from other UEs) or optionally in some example transmission of messages in a scheduling region.

If the UE detects the chosen resource is in use or being requested by another UE, the UE randomly picks another resource from the shared communications resources. The phase 1 may be repeated if the communications resources need to change.

This phase 1 solves collisions in most of the cases, with the exception being if two UE start listening at exactly the same sub-frame.

In Phase 2 the UE transmits in the selected communications resources or in the case in which a scheduling channel is present, the UE transmits a message to inform the other UEs that it intends to transmit in the corresponding communications resources of the shared channel After a random time a further listening process is performed to determine whether a collision has occurred because another UE is transmitting contemporaneously.

The UE may restart one or both of the phases if collision is detected.

The UE may also perform random back-off time before restarting.

This phase 2 is intended to address the case in which two UEs start at exactly the same time, and contention is not detected in phase 1. The random listening slot reduces overall probability of collision, so that the larger the number of preamble frames the lower the probability of collision.

The network or a co-ordinating UE may configure the length of the preamble phase based on e.g. number of devices in proximity In some example a counter may be incremented after each scheduling message transmission if this example embodiment is used. This can help to determine which UE should choose another resource in case of collision, for example if a scheduling message from another UE is detected with a higher counter, or if the UE detects another UE in phase 2, then a different set of communications resources can be chosen.

After the UE transmits the signals representing the data then the UE may wait for a predetermined period or a random period before it makes an attempt to transmit further data to avoid collisions with other UEs.

According to this arrangement a probability of collision between different transmitting UEs in proximity with one another is reduced compared to simply listening before transmitting. Furthermore, a relatively short delay for collision detection (in order of a few sub-frames) can be achieved, and a configurable preamble length can provide a facility for addressing different numbers of UEs in the system. For example a longer preamble length (the total number of sub-frames in phases 1 and 2) may be needed in case of high number of UEs to reduce collision probability.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

In the foregoing description D2D communications are described with reference to an LTE system, however the presently disclosed techniques are equally applicable to other LTE system structures and other systems which are compatible with D2D communications.

REFERENCES

[1] R2-133840, "CSMA/CA based resource selection," Samsung, published at 3GPP TSG-RAN WG2 #84, San Francisco, USA, 11-15 Nov. 2013.
[2] R2-133990, "Network control for Public Safety D2D Communications", Orange, Huawei, HiSilicon, Telecom Italia, published at 3GPP TSG-RAN WG2 #84, San Francisco, USA, 11-15 Nov. 2013.
[3] R2-134246, "The Synchronizing Central Node for Out of Coverage D2D Communication", General Dynamics Broadband UK, published at 3GPP TSG-RAN WG2 #84, San Francisco, USA, 11-15 Nov. 2013.
[4] R2-134426, "Medium Access for D2D communication", LG Electronics Inc, published at 3GPP TSG-RAN WG2 #84, San Francisco, USA, 11-15 Nov. 2013.
[5] R2-134238, "D2D Scheduling Procedure", Ericsson, published at 3GPP TSG-RAN WG2 #84, San Francisco, USA, 11-15 Nov. 2013.
[6] R2-134248, "Possible mechanisms for resource selection in connectionless D2D voice communication", General Dynamics Broadband UK, published at 3GPP TSG-RAN WG2 #84, San Francisco, USA, 11-15 Nov. 2013.
[7] R2-134431, "Simulation results for D2D voice services using connectionless approach", General Dynamics Broadband UK, published at 3GPP TSG-RAN WG2 #84, San Francisco, USA, 11-15 Nov. 2013.
[8] "D2D Resource Allocation under the Control of BS", Xiaogang R. et al, University of Electronic Science and Technology of China, https://mentor.ieee.org/802.16/dcn/13/16-13-0123-02-000n-d2d-resource-allocation-under-the-control-of-bs.docx
[9] US20130170387
[10] US20120300662
[11] LTE for UMTS: OFDMA and SC-FDMA Based Radio Access, Harris Holma and Antti Toskala, Wiley 2009, ISBN 978-0-470-99401-6.
[12] Study on LTE Device to Device Proximity Services, Qualcomm Incorporated, RP-122009.
[13] EP14153512.0
[14] EP14153530.2

The invention claimed is:
1. A circuitry for a communications device for performing device-to-device (D2D) communications with one or more other communications devices via a wireless access interface of a base station in a mobile communications network, comprising:
the circuitry configured to
receive signals from the one or more other communications devices via the wireless access interface;
determine in accordance with predetermined conditions whether the communications device is within a coverage area of the base station for transmitting or receiving radio signals using a wireless access interface provided by the mobile communications network; and
if the communications device is determined to be within the coverage area of the mobile communications network, transmit or receive signals via the wireless access interface to one or more other communications devices in accordance with the D2D communications using first communications resources of the wireless access interface allocated according to a first mode in which the mobile communications network performed resource allocation, or if the communications device is determined not to be within the coverage area of the mobile communications network, then transmit or receive the signals via the wireless access interface to one or more other communications devices in accordance with the D2D communications using second communications resources of the wireless access interface allocated according to a second mode in which the communications device allocates resources from a predetermined set of resources, wherein
if the communications device is determined to be within the coverage area of the mobile communications network, the transmitting or the receiving the signals via the wireless access interface using the first mode of resource allocation, includes
accessing the mobile communications network, by performing a Radio Resource Control (RRC) establishment procedure, to receive an allocation of the communications resources of the wireless access interface,
determining, while the communication device is within the coverage area, that the first communications resources are not allowed by detecting that the RRC establishment procedure has failed, and
transmitting or receiving the signals via the wireless access interface, after detecting that the RRC establishment procedure has failed, by triggering a frequency layer change to utilize the second communications resources allocated according to the second mode.
2. The communications device of claim 1, wherein the circuitry is configured to determine that the radio resources connection establishment procedure fails by detecting that a time after sending a radio resource control request message has exceeded a predetermined time.
3. The communications device of claim 2, wherein the predetermined time is less than a time associated with a radio resource establishment procedure failure within which more than one response to a message can be received which transmitted as part of the radio resource control establishment procedure.
4. The communications device of claim 1, wherein the circuitry is configured to:
receive an allocation of the communications resources of the wireless access interface by requesting an allocation of the communications resources of the wireless access interface from the mobile communications network for performing D2D communications in a radio resource connected state; and detect the failure condition by determining that the requested access to the communications resources of the wireless access interface are not allocated by the mobile communications network.

5. The communications device of claim 4, wherein the circuitry is configured to determine that the requested access to the communications resources of the wireless access interface are not allocated by the mobile communications network by detecting that a time after sending a random access request message has exceeded a predetermined time without being allocated the communications resources of the wireless access interface.

6. The communications device of claim 5, wherein the predetermined time is less than a time associated with a failure to receive more than one response message after transmitting the random access message.

7. A circuitry of a communications device, comprising:
transmitter circuitry configured to transmit signals to one or more other communications devices via a wireless access interface of a base station in a mobile communications network to perform device-to-device (D2D) communications,
receiver circuitry configured to receive signals from the one or more other communications devices via the wireless access interface, and
controller circuitry for controlling the transmitter circuitry and the receiver circuitry to transmit or to receive the signals via the wireless access interface to transmit or to receive data represented by the signals in accordance with a-device to device communication, and the controller circuitry is configured in combination with the transmitter circuitry and the receiver circuitry
to determine in accordance with predetermined conditions whether the communications device is within a coverage area for transmitting or receiving radio signals using a wireless access interface provided by a mobile communications network, and if the communications device is determined to be within the coverage area of the mobile communications network,
to transmit or to receive signals via the wireless access interface to one or more other communications devices in accordance with the device to device communications using communications resources of the wireless access interface allocated by the mobile communications network, or if the communications device is determined not to be within the coverage area of the mobile communications network, then
to transmit or to receive the signals via the wireless access interface to one or more other communications devices in accordance with the device to device communications by accessing the communications resources of the wireless access interface in accordance with a device to device communications protocol, wherein
if the communications device is determined to be within the coverage area of the mobile communications network, the controller circuitry is configured in combination with the transmitter circuitry and the receiver circuitry
to transmit or to receive the signals via the wireless access interface using communications resources of the wireless access interface allocated by the mobile communications network by
accessing the mobile communications network, by performing a radio resource control (RRC) establishment procedure to request an allocation of the first communications resources to receive an allocation of the communications resources of the wireless access interface,
determining, while the communication device is within the coverage area, that the first communications resources are not allocated by detecting that the RRC establishment procedure has failed, and
transmitting or receiving the signals via the wireless access interface, after detecting that the RRC establishment procedure has failed, by triggering a frequency layer change to utilize the second communications resources allocated in accordance with the device to device communications protocol.

* * * * *